(12) United States Patent
Hope et al.

(10) Patent No.: US 6,651,696 B2
(45) Date of Patent: Nov. 25, 2003

(54) RELIEF VALVE

(75) Inventors: Rodney C. Hope, Sugar Land, TX (US); Richard R. Watson, Missouri City, TX (US); F. Harold Hollister, Richmond, TX (US)

(73) Assignee: Gilmore Valve Co., Ltd., Houston, TX (US)

( * ) Notice: Subject to any disclaimer, the term of this patent is extended or adjusted under 35 U.S.C. 154(b) by 139 days.

(21) Appl. No.: 09/957,009

(22) Filed: Sep. 20, 2001

(65) Prior Publication Data

US 2003/0051756 A1 Mar. 20, 2003

(51) Int. Cl.[7] .............................................. F16K 17/04
(52) U.S. Cl. ........................ 137/540; 137/469; 137/494; 137/529; 251/282; 251/284; 251/337
(58) Field of Search ................................. 137/469, 494, 137/529, 540; 251/175, 176, 282, 284, 337

(56) References Cited

U.S. PATENT DOCUMENTS

| | | | |
|---|---|---|---|
| 3,447,565 A | * 6/1969 | Davis, Jr. | ................. 251/337 |
| 3,601,149 A | 8/1971 | Gilmore | |
| 3,917,220 A | 11/1975 | Gilmore | |
| 4,111,227 A | * 9/1978 | Sigott et al. | ................. 137/469 |
| 4,456,028 A | 6/1984 | Watson | |
| 4,493,335 A | 1/1985 | Watson | |
| 4,793,590 A | 12/1988 | Watson | |
| 4,856,557 A | 8/1989 | Watson | |
| 5,157,947 A | * 10/1992 | Weirich et al. | ............. 137/494 |

OTHER PUBLICATIONS

Hydraulic Relief Valves; 22511, 25307, 25311.

Hydraulic Relief Valves; 25320, 25323.

* cited by examiner

Primary Examiner—Michael Powell Buiz
Assistant Examiner—Ramesh Krishnamurthy
(74) Attorney, Agent, or Firm—Blackwell Sanders Peper Martin LLP

(57) ABSTRACT

A relief valve with two outlet ports increases the flow capacity of the valve when open. In an alternative embodiment, a relief valve with two outlet ports also has at least two springs stacked vertically. Alternative seal assemblies can be used with the aforementioned dual outlet port valves.

6 Claims, 18 Drawing Sheets

RELIEF VALVE

BACKGROUND OF THE INVENTION

1. Field of the Invention

The relief valve is installed in piping systems, pressure vessels and other applications to relieve overpressure and thus prevent damage to the system.

2. Description of Related Art

Samuel E. Gilmore, the founder of Gilmore Valve Co., invented a Relief Valve, which is the subject of U.S. Pat. No. 3,601,149, which was issued on Aug. 24, 1971. Several prototypes of this Relief Valve were produced with a single outlet, but it was too expensive to sell because of the complex design. This prior art valve, as taught in the patent, utilized a movable seal carrier, sometimes referred to as a conduit means, to transport opposing coaxial seal tubes from a closed position to an open position. These seal tubes engaged opposing coaxial cylindrical plugs. Each cylindrical plug was held in place by an outer portion of the body. One of these outer body portions contained the outlet of the valve and the opposing outer body portion was blank. In other words, the valve had a single inlet port and a single outlet port.

In the open position, the valve was designed to allow fluid to flow from the inlet through an internal bore in the body and another bore in one of the cylindrical plugs to the outlet. Apparently, this valve was never even prototyped with two opposing coaxial outlets although the patent points out that "if desired, both outer portions could include outlets." In an alternative embodiment, one of the cylindrical plugs contained a bore and the opposing plug was merely blank because there was no fluid flow on the side of the valve opposite the outlet. The purpose of this second blanked port was to permit installation of the internal valve components. The Relief Valve of U.S. Pat. No. 3,601,149 was a commercial failure because of its complexity and expense and was never sold in any configuration.

After more than a decade had passed, another engineer at Gilmore Valve Co. developed a different design that was less complex and therefore more economical to produce. U.S. Pat. No. 4,456,028 for a Relief Gate Valve was issued in 1984 and was assigned to Gilmore Valve Co., the assignee of the present invention. This Relief Gate Valve is shown in cross-section as FIG. 1 of the present patent application. This prior art valve had a single inlet port and a single outlet port. The prior art valve of FIG. 1 has been produced and sold in huge commercial quantities by Gilmore Valve Co. and is a commercial success. However, there is still a need for a relief valve that has larger flow capacities at lower overpressures than the valve of FIG. 1. For more than 30 years, a double port relief valve was not available from Gilmore Valve Co.

Relief valves are placed in piping systems, pressure vessels and other systems to vent excess pressure from the system to prevent damage to the system, to the environment and to individuals. It is essential that the relief capacity of the valve meet or exceed the maximum potential capacity of the system to prevent excessive pressure and possible explosion. Traditionally, there were two standard solutions to the need for greater flow capacity. The first solution was to put two or more valves in parallel which more than doubles the cost of the system and makes it more complex to install and maintain. The other traditional alternative was to install a bigger valve with a bigger spring, a bigger outlet and bigger piping. Both of these traditional solutions are expensive.

There is therefore a need for a more economical solution to the problem of increased flow through relief valves.

There is a need to keep overpressure in relief valves and systems to a minimum. Overpressure is the amount of pressure build up in a system over the set pressure of the relief valve to achieve the required relief capacity. For example, if the set pressure of a relief valve is 5,000 psi, it will begin to open at 5,000 psi. However, the pressure in the system and the relief valve may continue to rise because most liquid relief valves typically do not snap to the full flow open position at the set pressure (sometimes referred to as set point). Instead, relief valves typically open only a little at set pressure, and higher pressure will open the valve even further. For example, some relief valves might not achieve a full open position until the pressure in the system is 6,000 psi. In this example, the valve experienced 1,000 psi of overpressure. When a relief valve is open and flowing, the flow rate is also sometimes referred to as relief rate. Excessive overpressure is undesirable because it places a strain on piping and vessels and can result in catastrophic failure/explosion.

After relieving, the system pressure must drop below the set pressure before the relief valve will re-seal. The pressure where this occurs is called the reset pressure and the pressure band between the set pressure and reset pressure is referred to as the blowdown dead band. Blowdown dead band is primarily a function of seal friction. Blowdown dead band is typically expressed as a percentage of the set point. For example, if the set point is 5,000 psi, and the blowdown dead band is 20%, system pressure must fall to approximately 4,000 psi before the relief valve will close and reseat. High blowdown dead bands in this type of relief valve are undesirable. There is a need to reduce the blowdown dead band in relief valves with increased flow rates.

BRIEF SUMMARY OF THE INVENTION

The double port relief valve of the present invention doubles the relief rate for a given overpressure when compared with the prior art single port valve (i.e. FIG. 1). In an alternative embodiment, the dual port stacked spring relief valve (FIGS. 16 and 17) quadruples the relief rate for a given overpressure when compared with single port prior art valve (i.e. FIG. 1). Improved seal designs in the present invention reduce the friction when compared with prior art designs. The single port prior art relief valve (i.e. FIG. 1) can be retrofitted to a dual port design and can then be reinstalled in the field. Retrofitting is accomplished by boring another hole in the body to create a second outlet port. A new seal assembly and seal carrier is then installed. This retrofit is a novel solution to situations that require increased flow. Use of common springs in the present invention and the alternative embodiments reduces the number of parts that must be carried in inventory to produce this line of relief valves.

DETAILED DESCRIPTION OF THE INVENTION

Figure 1:
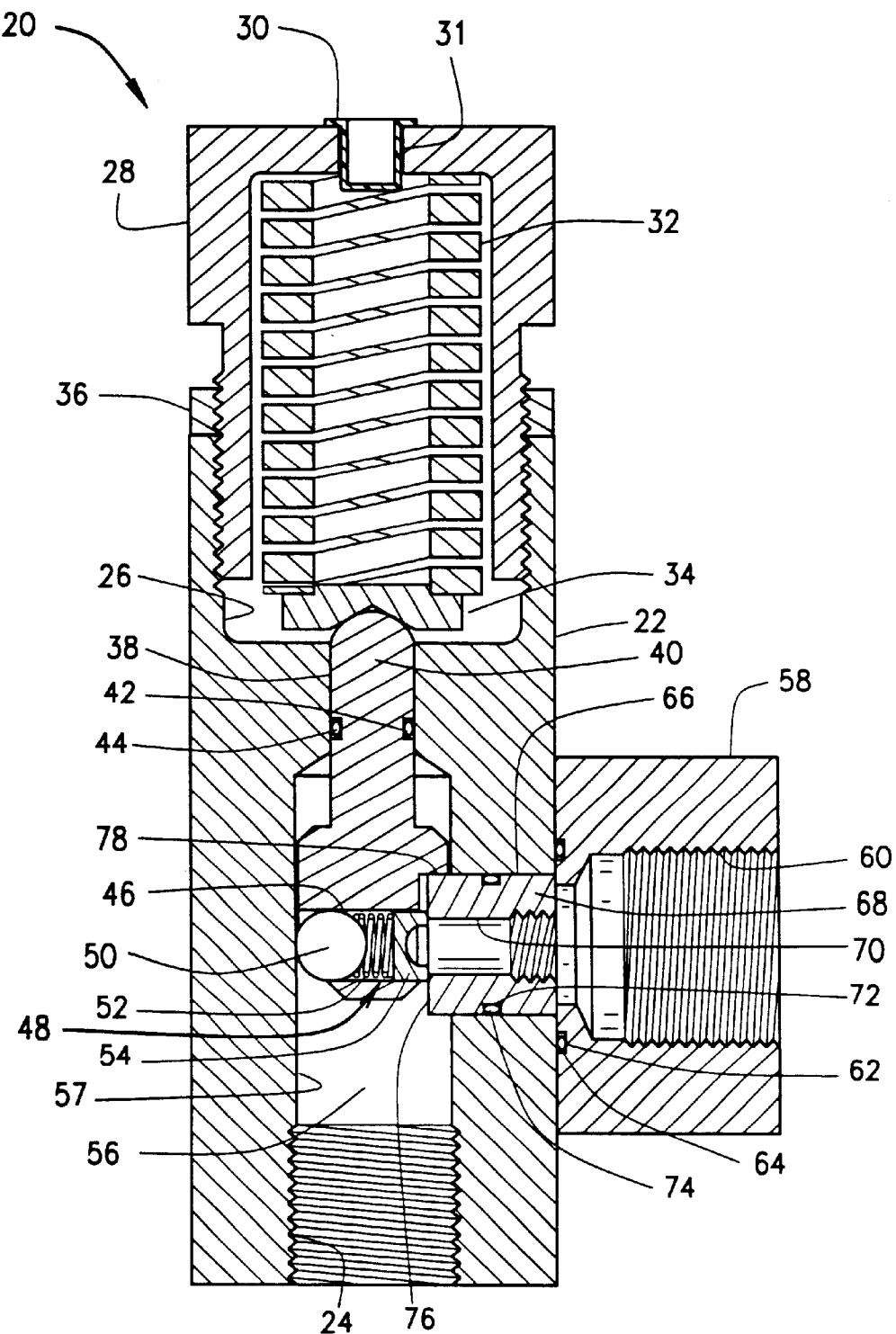
FIG. 1 is a section view of the single port prior art relief valve disclosed in U.S. Pat. No. 4,456,028. The valve is shown in the closed position.
Figure 6:
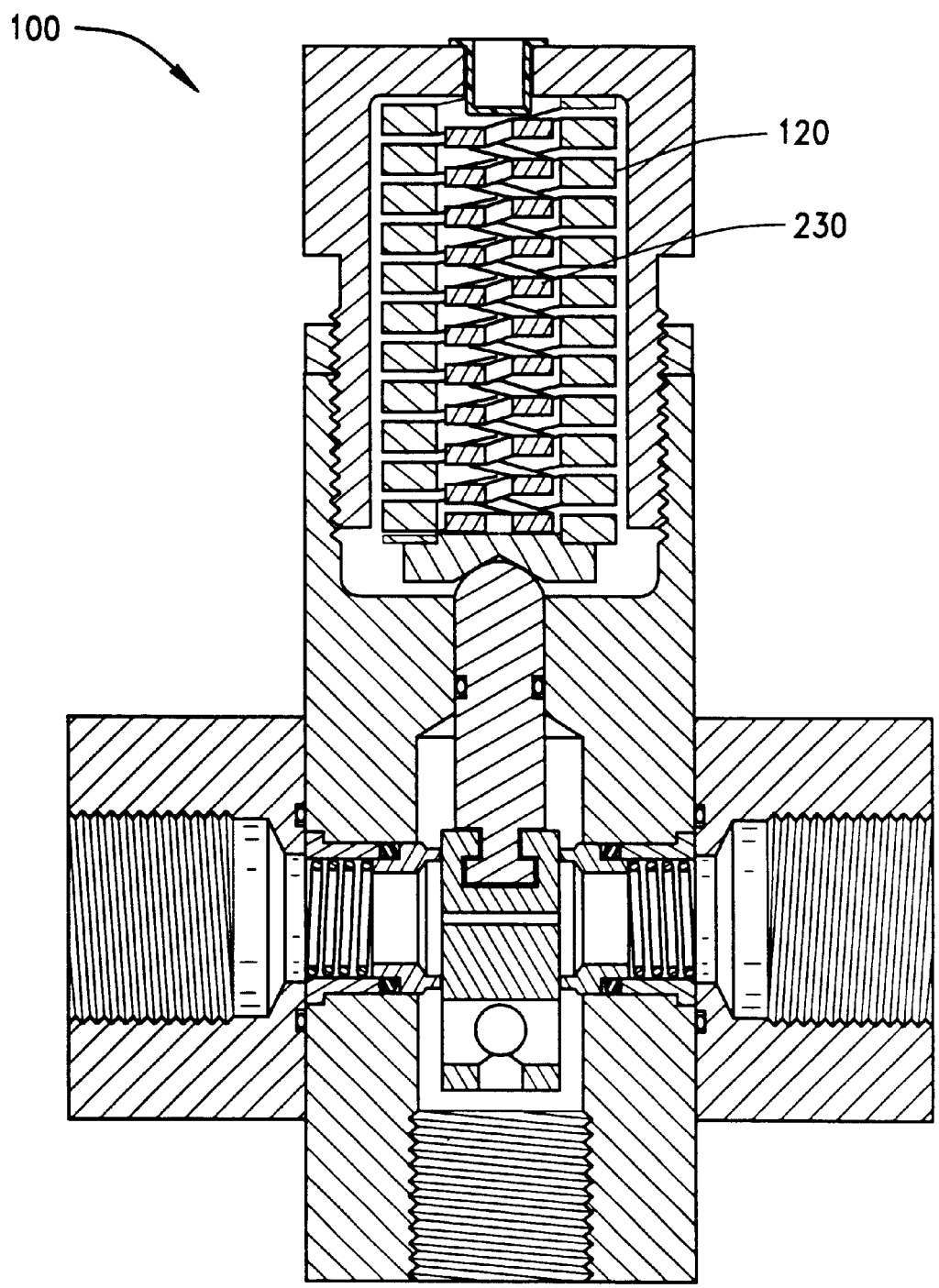
FIG. 6 is a section view of the valve of FIG. 3, except a second spring has been added acting in parallel with the main spring to increase the set pressure of the valve.
Figure 7:
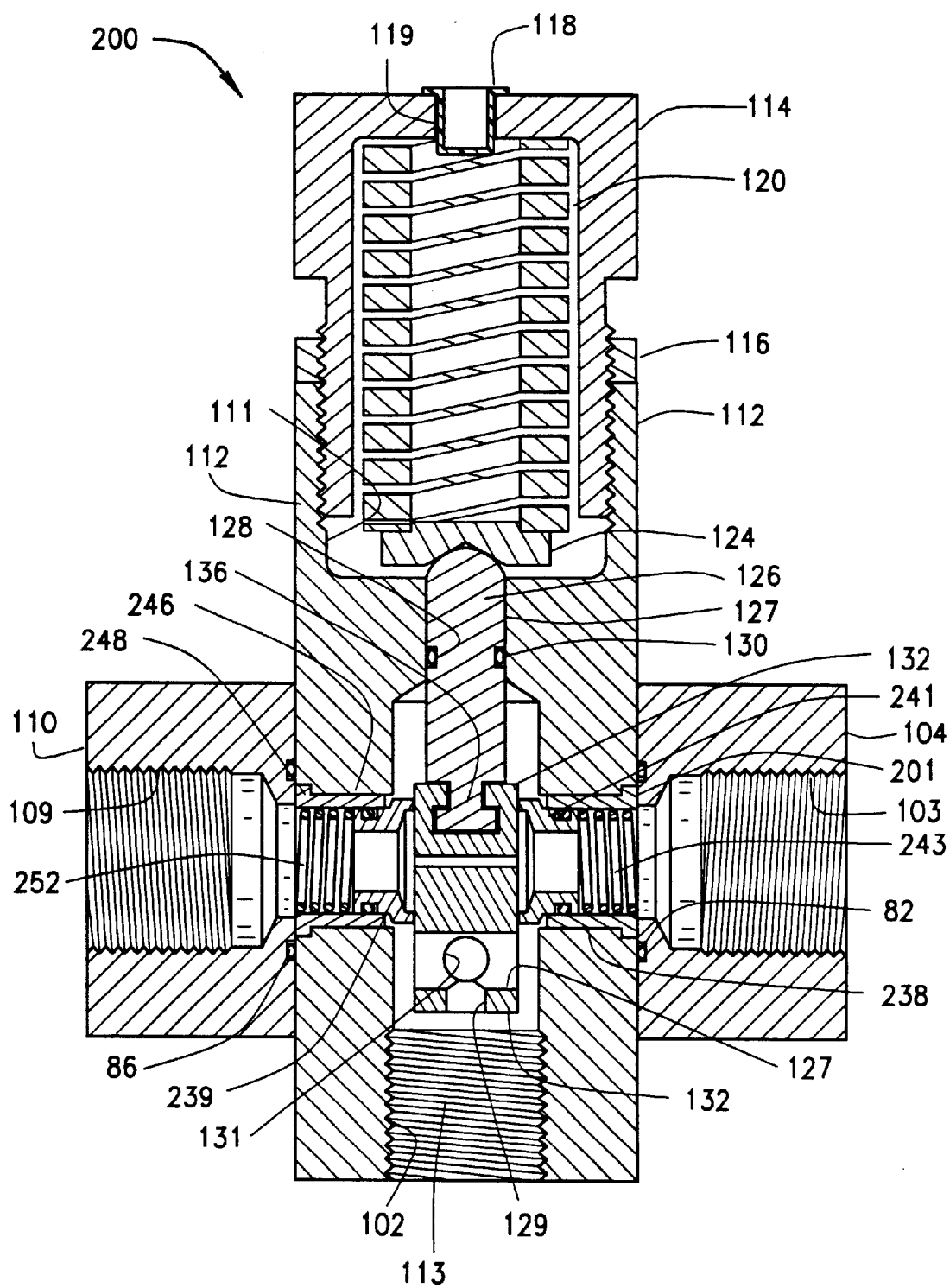
FIG. 7 is a section view of the first alternative embodiment of the double port relief valve. The valve is shown in the closed position.
Figure 8:
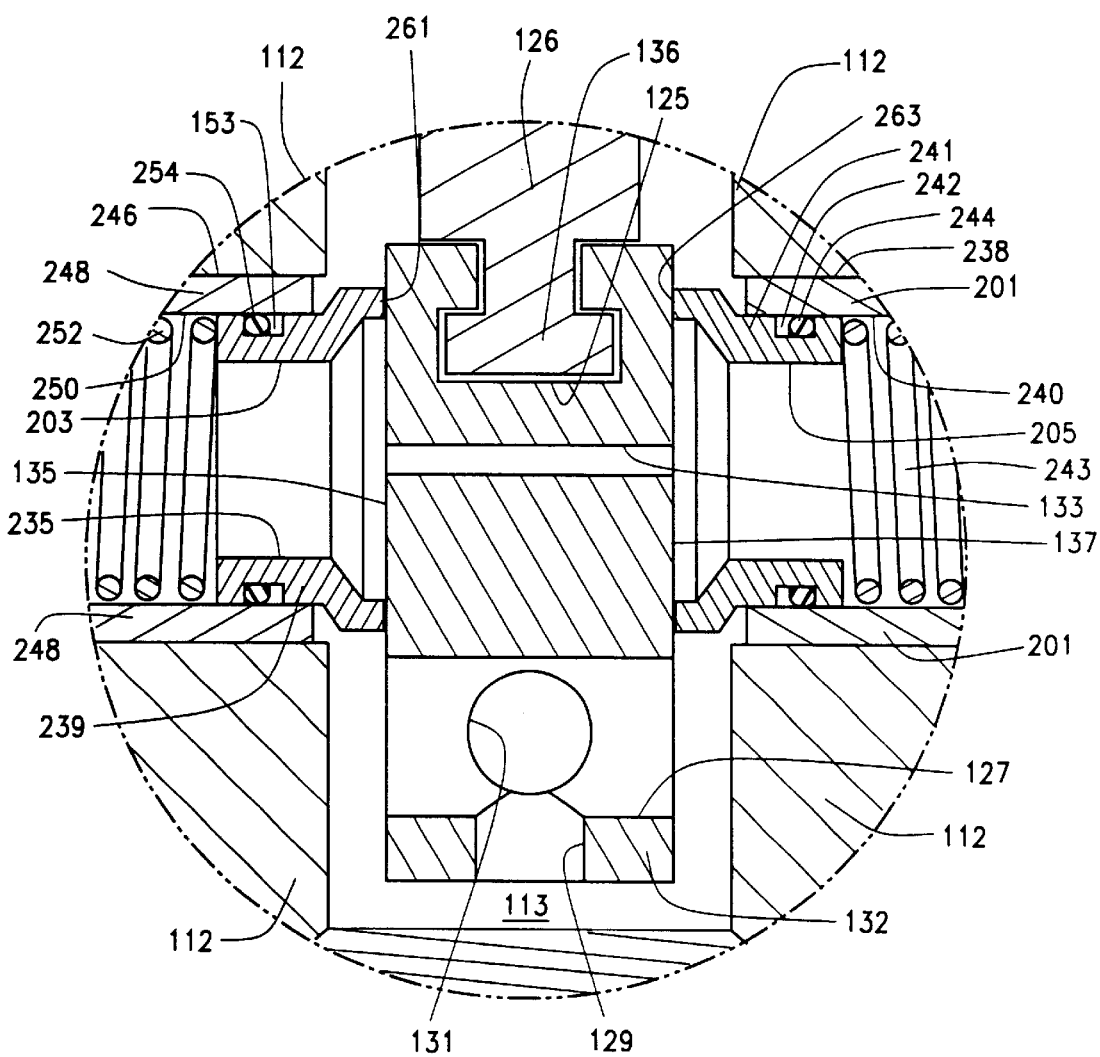
FIG. 8 is an enlarged section view of the gate and seal assembly of FIG. 7. The valve is shown in the closed position.
Figure 9:
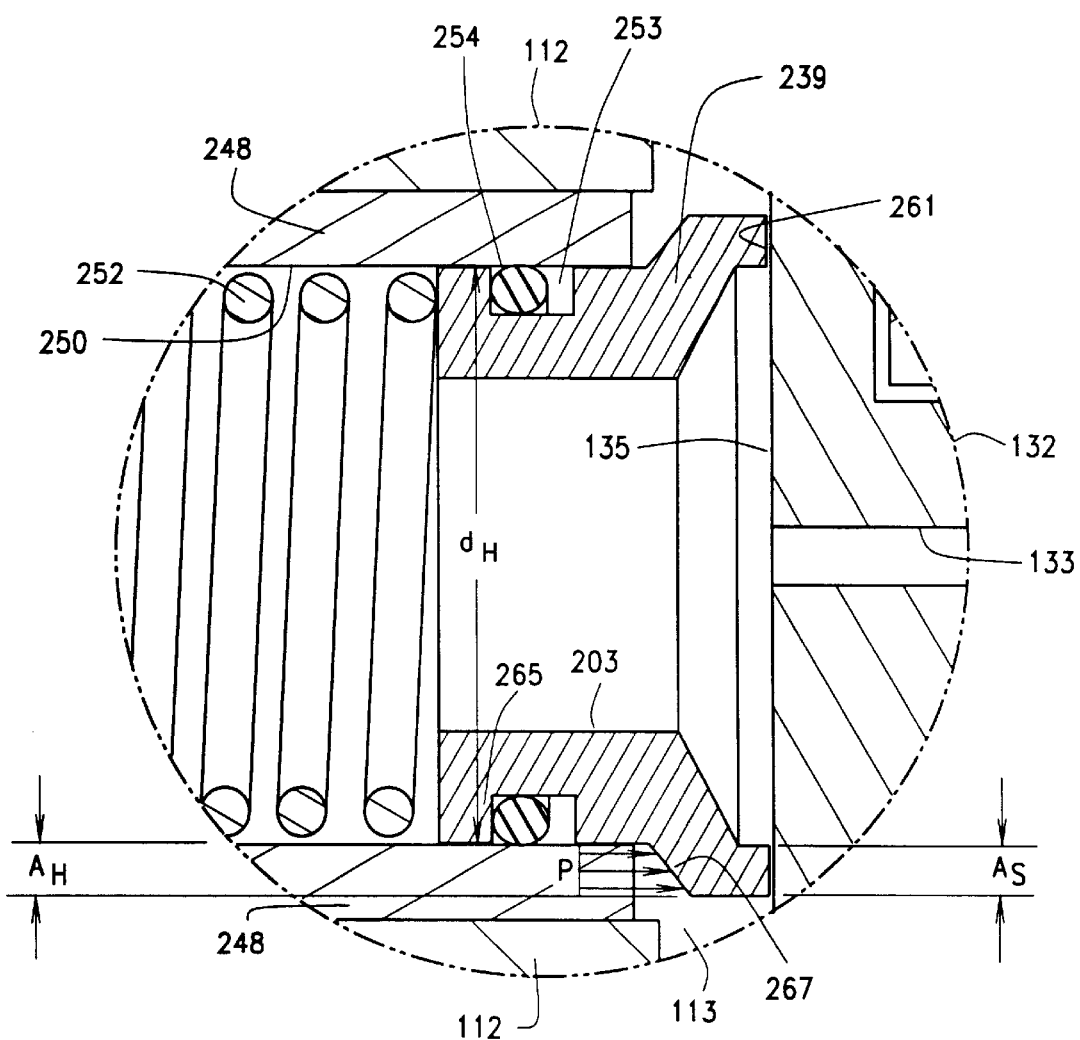
FIG. 9 is an enlargement of one seal ring of FIG. 7 and a portion of the gate. The valve is shown in the closed position.
Figure 10:
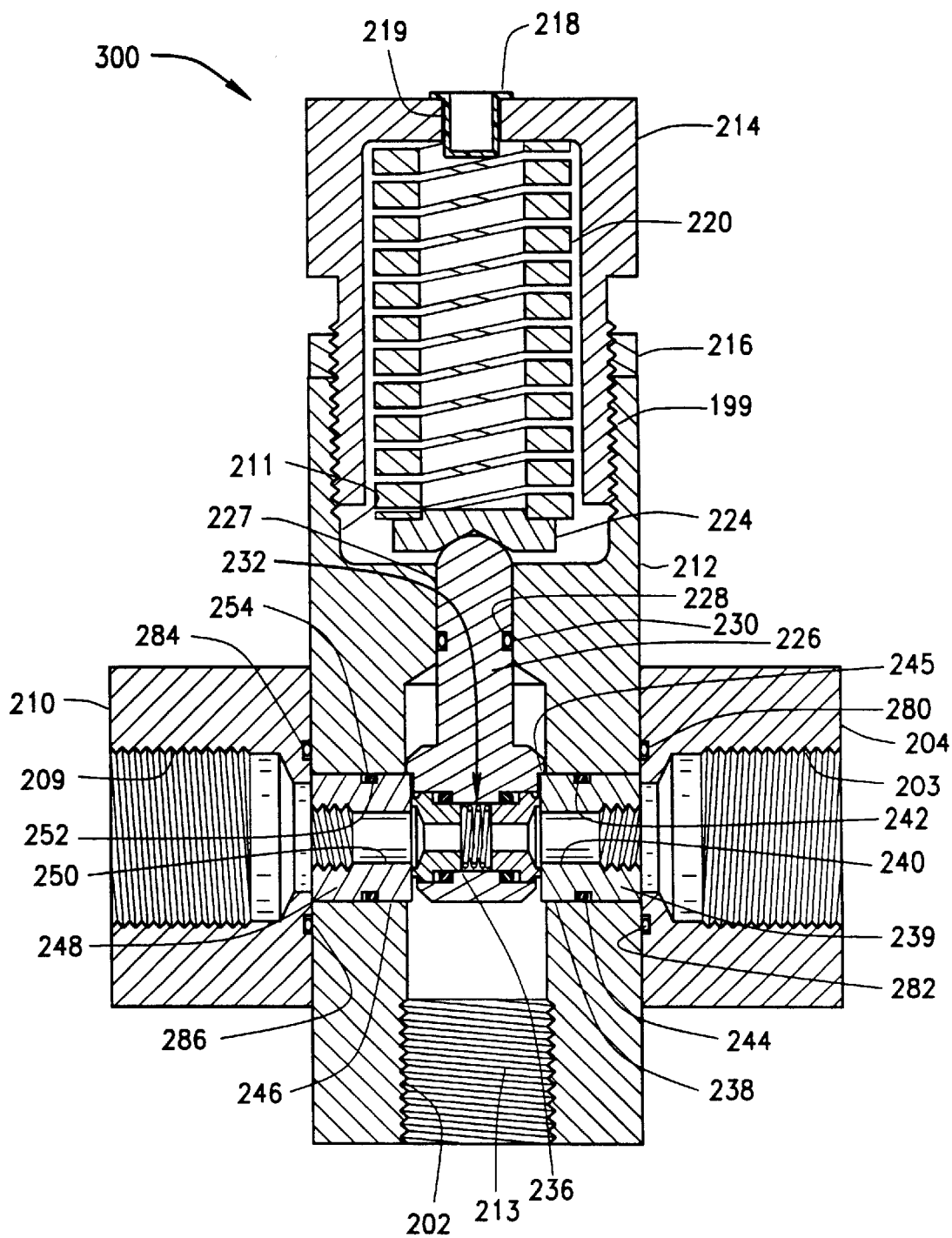
FIG. 10 is a section view of the second alternative embodiment of the double port relief valve. The valve is shown in the closed position.
Figure 11:
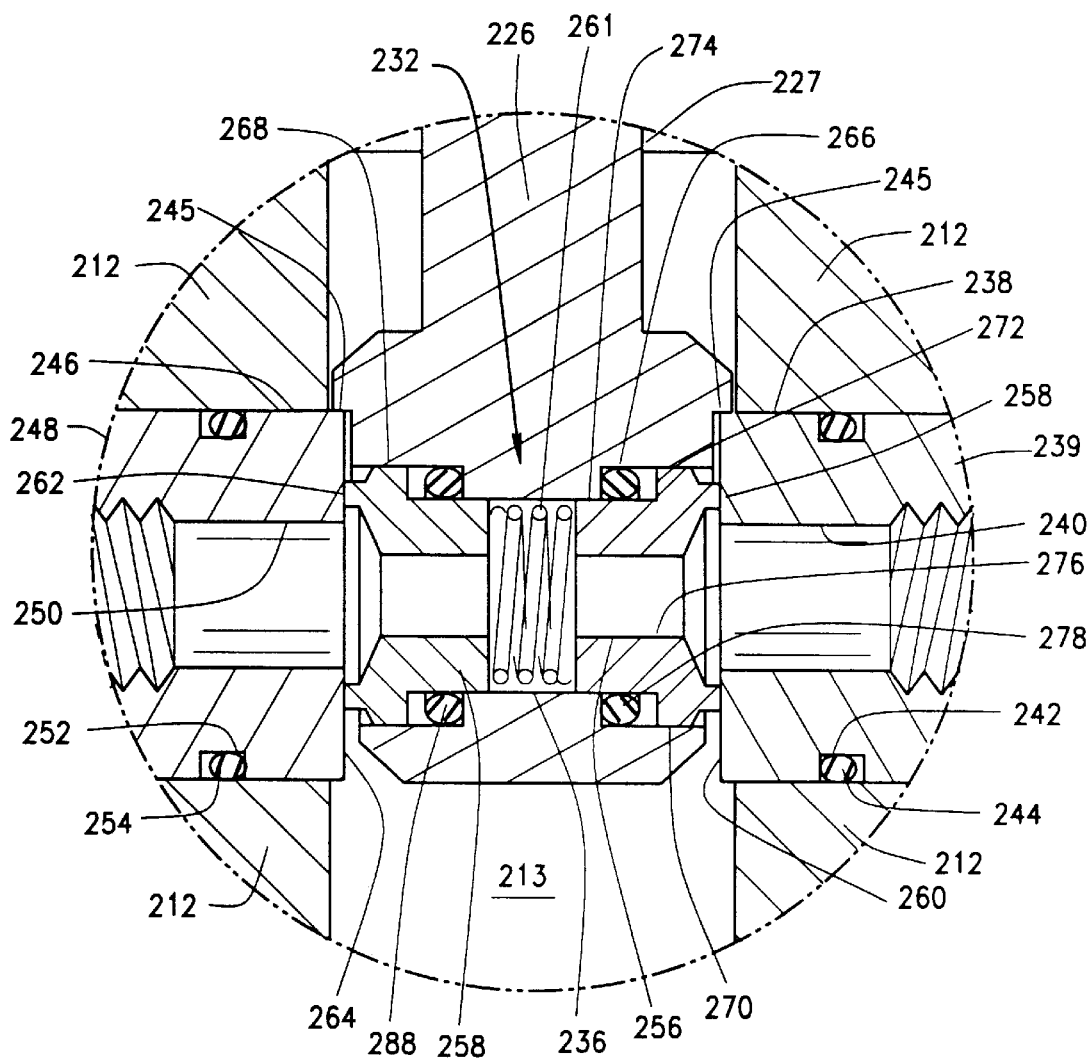
FIG. 11 is an enlarged section view of the gate and seal assembly of FIG. 10. The valve is shown in the closed position.
Figure 12:
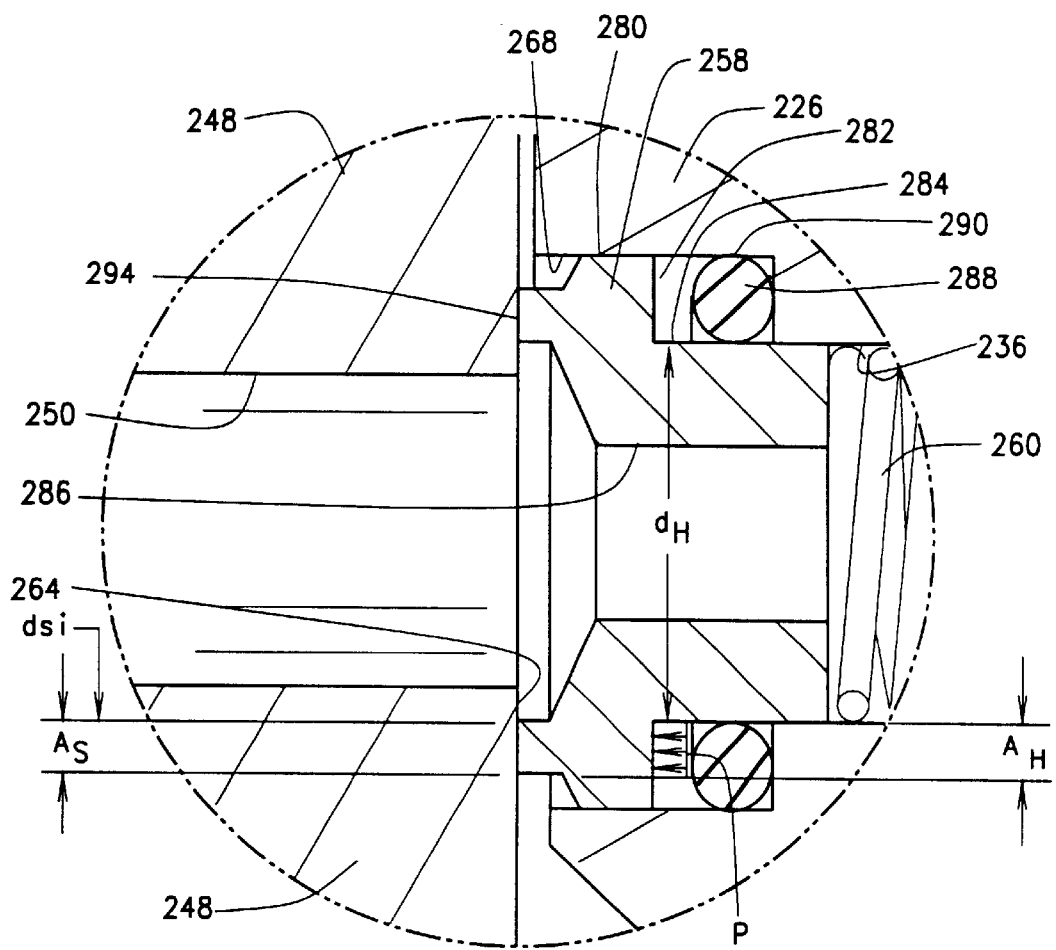
FIG. 12 is an enlargement of one seal ring of FIG. 10 and a portion of the gate. The valve is shown in the closed position.
Figure 13:
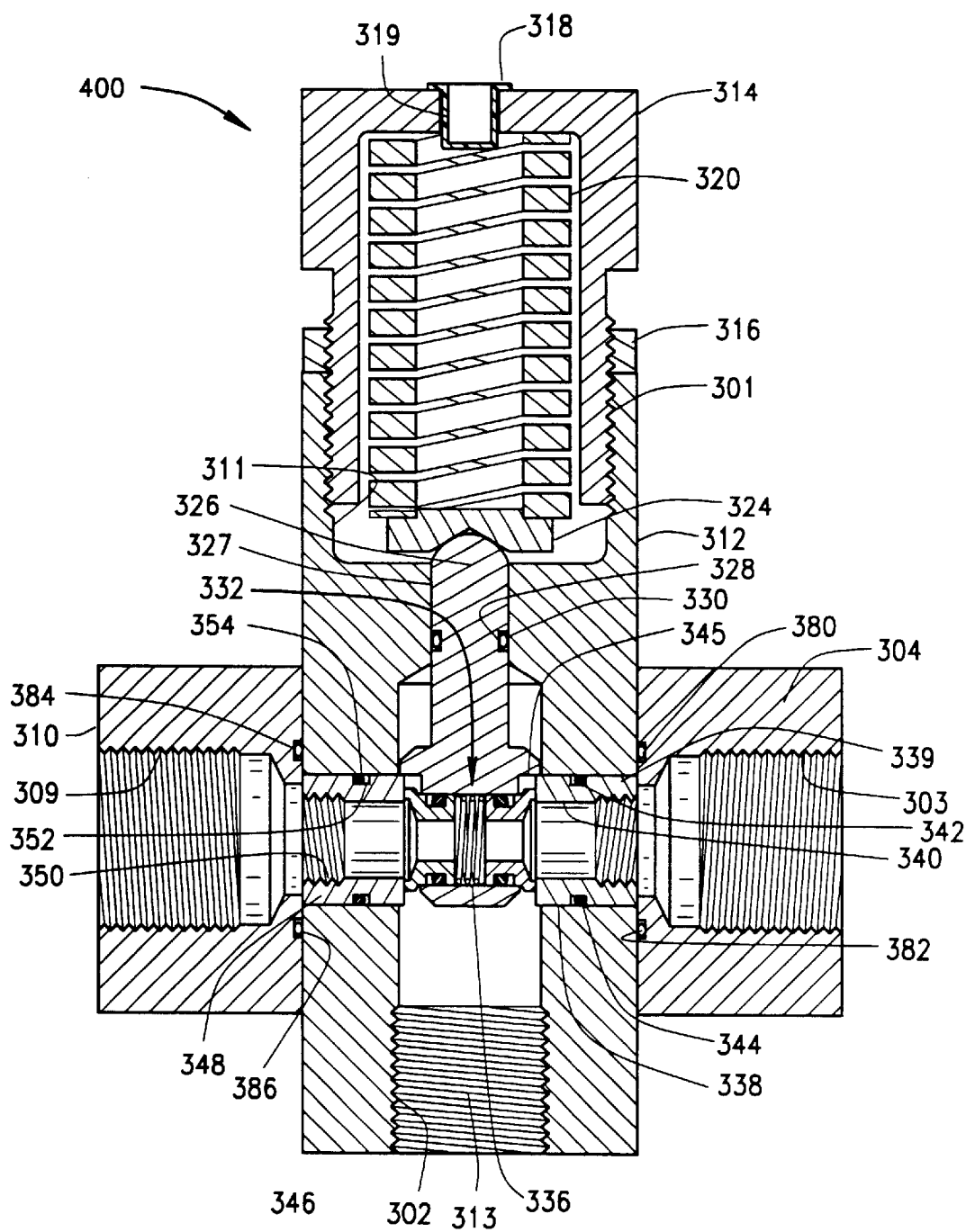
FIG. 13 is a section view of the third alternative embodiment of the double port relief valve. The valve is shown in the closed position.
Figure 14:
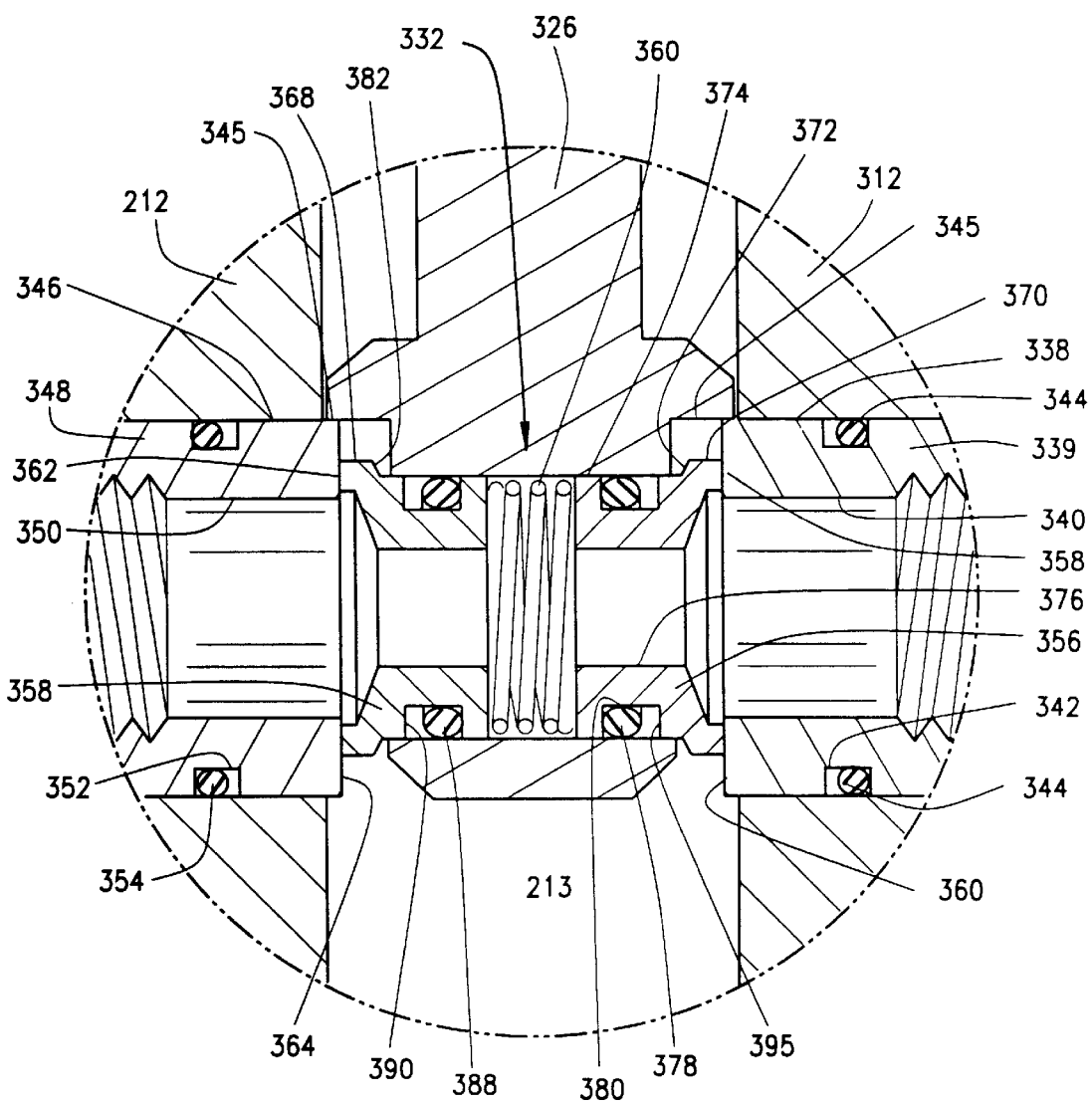
FIG. 14 is an enlarged section view of the gate and seal assembly of FIG. 13. The valve is shown in the closed position.
Figure 15:
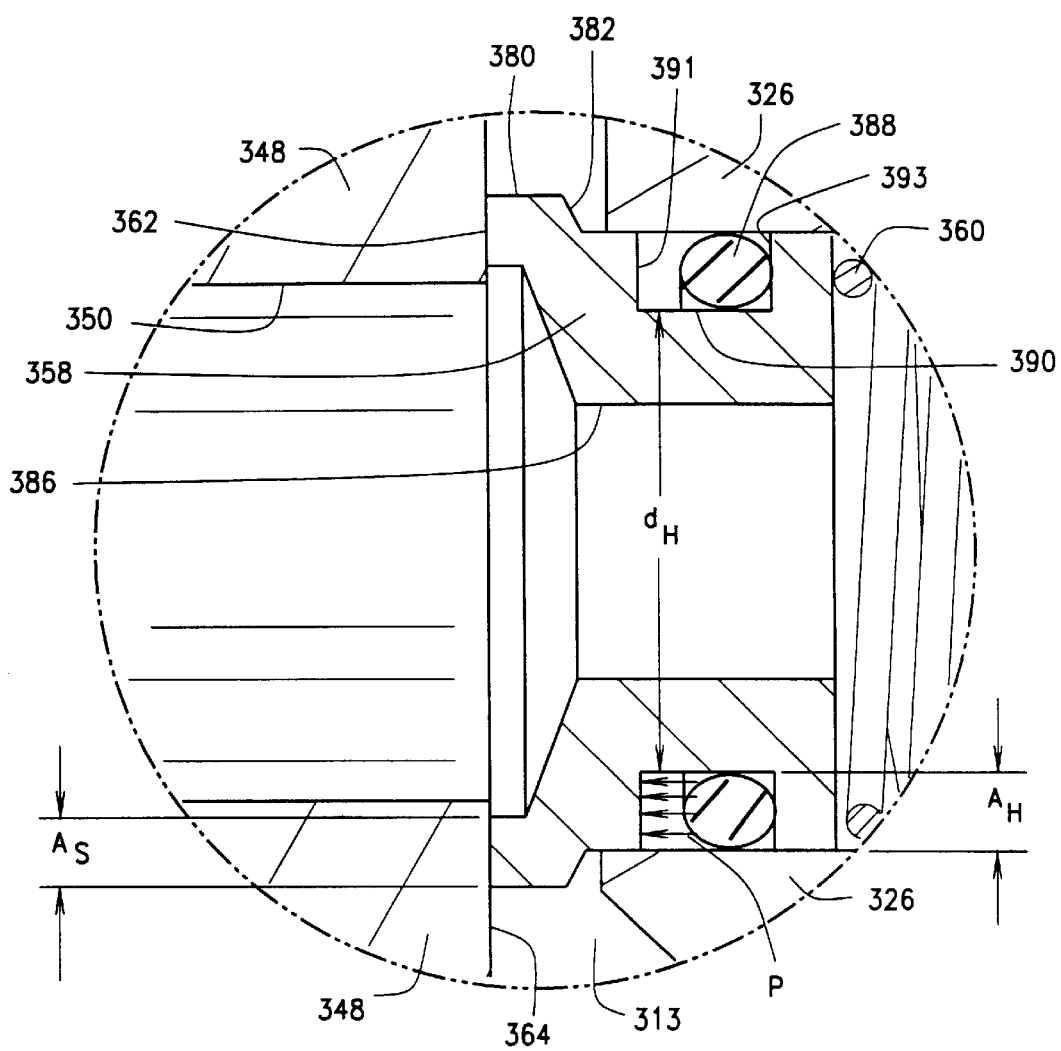
FIG. 15 is an enlargement of one seal ring of FIG. 13 and a portion of the gate. The valve is shown in the closed position.
Figure 16:
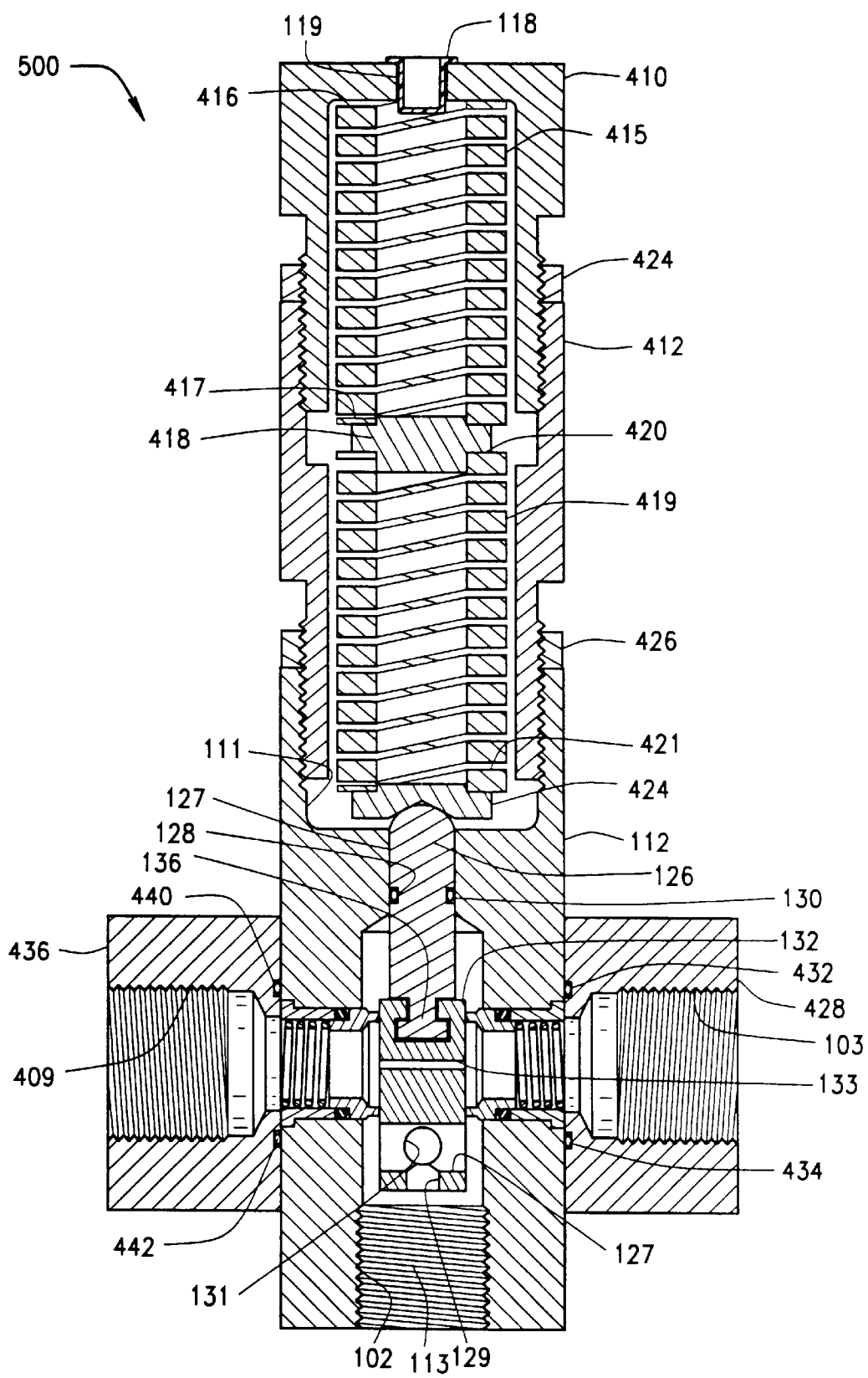
FIG. 16 is a section view of the dual port stacked spring relief valve. The valve is shown in the closed position.
Figure 17:
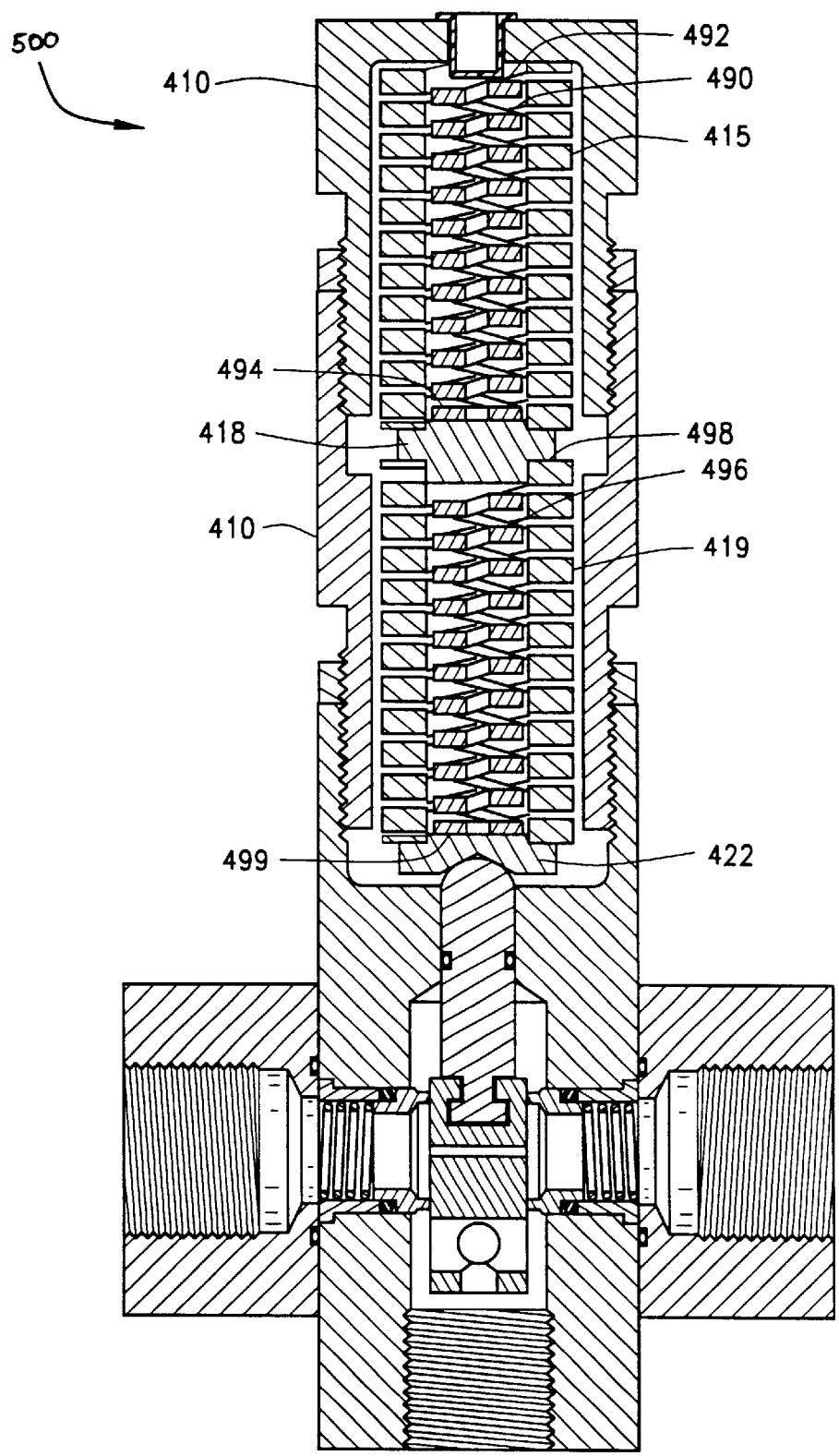
FIG. 17 is a section view of the dual port stacked spring relief valve of FIG. 16, except two interior springs have been added. The valve is shown in the closed position.

The prior art single port relief valve 20 is shown in FIG. 1. The present invention, a double port relief valve 100, is shown in FIGS. 2–6. A first alternative embodiment 200, with a different seal assembly, is shown in FIGS. 7–9. A second alternative embodiment 300 is shown in FIGS. 10–12. A third alternative embodiment 400 is shown in FIGS. 13–15. A fourth alternative embodiment, the double port stacked spring version 500, is shown in FIGS. 16 and 17. All of these valves, 100, 200, 300, 400 and 500 have superior performance when compared with the prior art valve 20 of U.S. Pat. No. 4,456,028. The various flow characteristics of the double port valves 100, 200, 300 and 400 and the double port stacked spring valve 500 are compared in the chart, FIG. 18.

FIG. 1 is a section view of a prior art relief valve generally identified by the numeral 20 which is shown in U.S. Pat. No. 4,456,028, assigned to Gilmore Valve Co., the assignee of the present invention. The blow down band of valve 20 is approximately 20%. The relief valve 20 has a single inlet and a single outlet. The relief valve 20 has a body 22 which defines an inlet 24 which is connected to a piping system, pressure vessel or other system which is likewise connected to a pressurized fluid source, not shown. Typically, the inlet 24 is threaded to facilitate connection to exterior piping. On the opposite end of the body 22 from the inlet 24 is a spring cavity 26. An adjusting cap 28 threadably engages the spring cavity 26. Flats are formed on the exterior surface of the adjusting cap 28 to facilitate manipulation with a wrench or other tool. A plastic plug 30 is placed in a bore 31 in the top of the adjusting cap 28.

A spring 32 rests on a spring follower 34, sometimes referred to as a spring disk. A seal carrier 40 bears against the spring disk 34 and the force of the spring 32 is thus transmitted to the seal carrier 40.

The spring 32 is captured between the adjusting cap 28 and the spring disk 34. Rotation of the adjusting cap 28 compresses or relaxes the tension in the spring 32. Rotation of the adjusting cap 28 increases or decreases the set point (set pressure) of the valve 20. When the appropriate set point is achieved, a lock nut 36 is tightened against the body 22 to fix the position of the adjusting cap 28.

A groove 42 is formed in the outside circumference of the seal carrier 40. An o-ring 44 is placed in the channel 42 achieving a seal between the body 22 and the seal carrier 40.

A transverse bore 46 is formed in one end of the seal carrier 40 to receive the seal assembly generally referred to by the numeral 48. The seal assembly 48 includes a ball 50, a seal spring 52 and a seal disk 54. The seal spring 52 has a spring rate of approximately 25 lb./in. The seal carrier 40 moves axially inside a central flow passageway 56 in the body 22 of the valve 20. A flange 58 is secured by a plurality of bolts, not shown to the body 22. An outlet 60 is formed in the flange 58 and is preferably threaded to facilitate the connection to exterior piping. The outlet 60 is vented to atmosphere. A groove 62 is formed in the flange 58 surrounding the outlet 60. An o-ring 64 is placed in the channel 62 to form a seal between the body 22 and the flange 58.

A bore 66 is formed in the body 22 to receive the seal plate 68. A through bore 70 is formed in the center of the seal plate 68 and is in fluid communication with the outlet 60. A groove 72 is formed in the outer circumference of the seal plate 68. An o-ring 74 is positioned in the groove 72 to achieve a seal between the body 22 and the seal plate 68. A shoulder 78 is formed on the seal carrier 40. The shoulder 78 abuts the seal plate 68 and limits the travel of the seal carrier 40.

A flat sealing surface 76 is formed on one end of the seal plate 68. The seal disk 54 contacts the sealing surface 76 of the seal plate 68. Typically, the sealing faces of the seal disk 54 and the seal plate 68 are formed from precision ground and lapped metal to achieve a metal-to-metal seal.

The relief valve 20 is normally in the closed position as shown in FIG. 1. When excess pressure develops in the protected device, it communicates to the inlet 24, and acts over the area of the seal carrier stem 40 resulting in upward force of the seal carrier against the spring. When this force exceeds the preset force on the spring 32, the seal carrier 40 moves upward and the seal disk 54 slides across the sealing surface 76 exposing the bore 70 to central flow passageway 56 allowing fluid to pass through the outlet 60 through the outlet to vent to atmosphere. Fluid flows from the inlet 24 through the central flow passageway 56 through the bore 70 to the outlet 60 when the valve 20 is in the open position. When the excess pressure has dissipated, the spring 32 urges the seal carrier 40 back into the closed position of FIG. 1. A shoulder 78 on the seal carrier 40 engages a portion of the seal plate 68 thus limiting the downward travel of the seal carrier 40.

The seal assembly 48 operates as follows. The seal spring 52 exerts force on the ball 50 and the seal disk 54. The ball 50 contacts the wall 57, which defines the central flow passageway 56. The seal disk 54 contacts and seals against the sealing surface 76 of the seal plate 68, thus blocking flow to the outlet 60 when the valve is closed.

Figure 2:
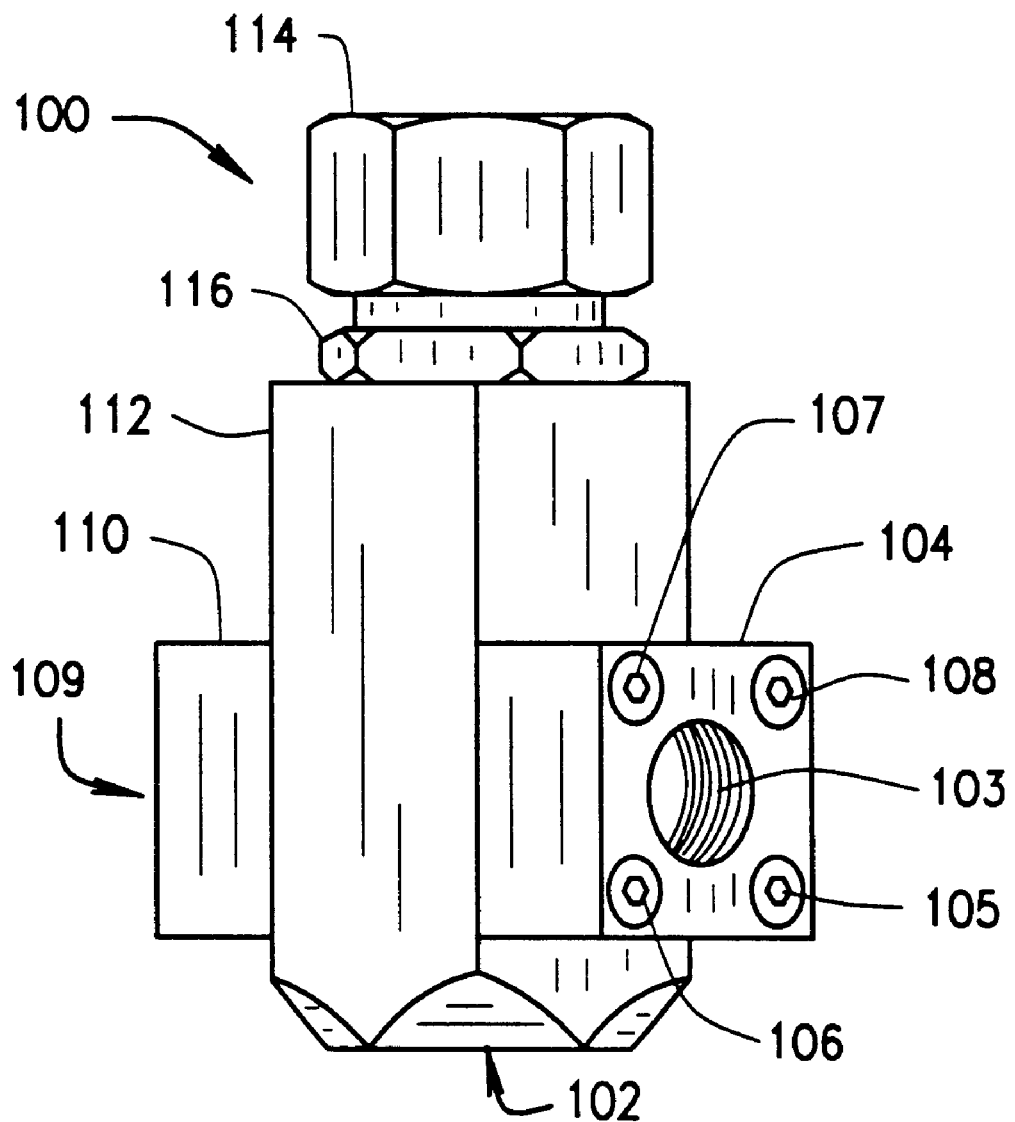
FIG. 2 is a perspective view of the double port relief valve of the present invention.

FIG. 2 is a perspective view of the double port relief valve of the present invention generally identified by the numeral 100. The inlet 102 is typically threaded to facilitate connection to a piping system, pressure vessel or other system in order to protect the system from excess pressure from a pressurized fluid source such as a pump. When the relief valve 100 opens, fluid moves through the inlet 102 and is vented through the outlets 103 and 109. The outlets 103 and 109 are opposing and coaxial. The outlet 103 is defined by flange 104. The flange 104 is secured to the body 112 by a plurality of bolts 105, 106, 107 and 108. The opposing outlet 109 is defined by the first flange 110, which is likewise secured to the body 112 by a plurality of bolts, not shown. For purposes of claim interpretation, flange 104 and the first flange 110 may be included as a part of the body 112. The outlets 103 and 109 are vented to atmosphere.

An adjusting cap 114 threadably engages the body 112. When the adjusting cap 112 is rotated clockwise, it raises the set pressure of the valve 100. When the cap 112 is rotated counter-clockwise, it lowers the set pressure of the valve 100. When the desired set pressure is achieved, the adjusting cap 114 is secured in position by tightening lock nut 116. To readjust the set point of the valve, the lock nut 116 must be loosened in order to rotate the adjusting cap 114.

Figure 3:
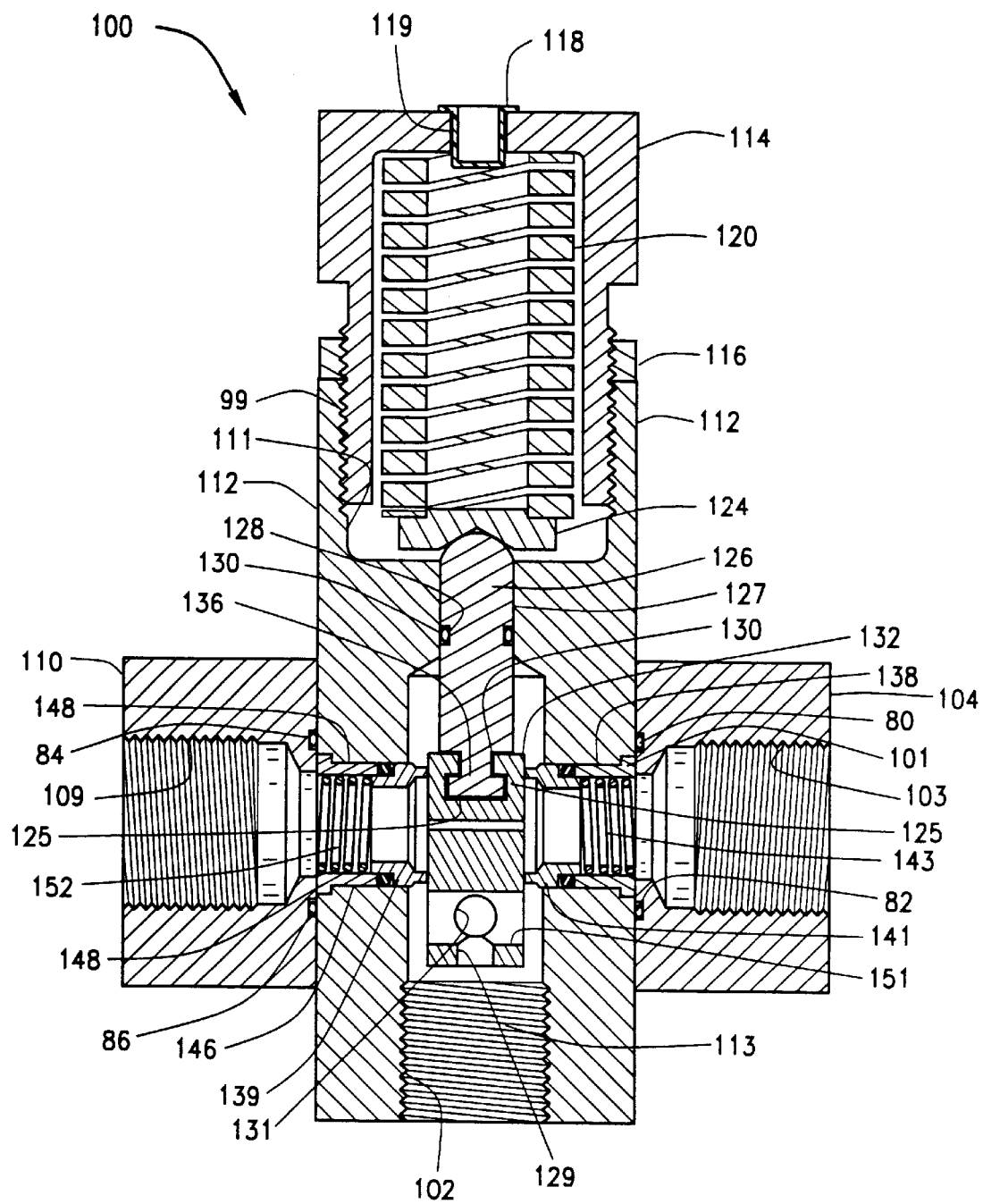
FIG. 3 is a section view of the double port relief valve of FIG. 2. The valve is shown in the closed position.
Figure 4:
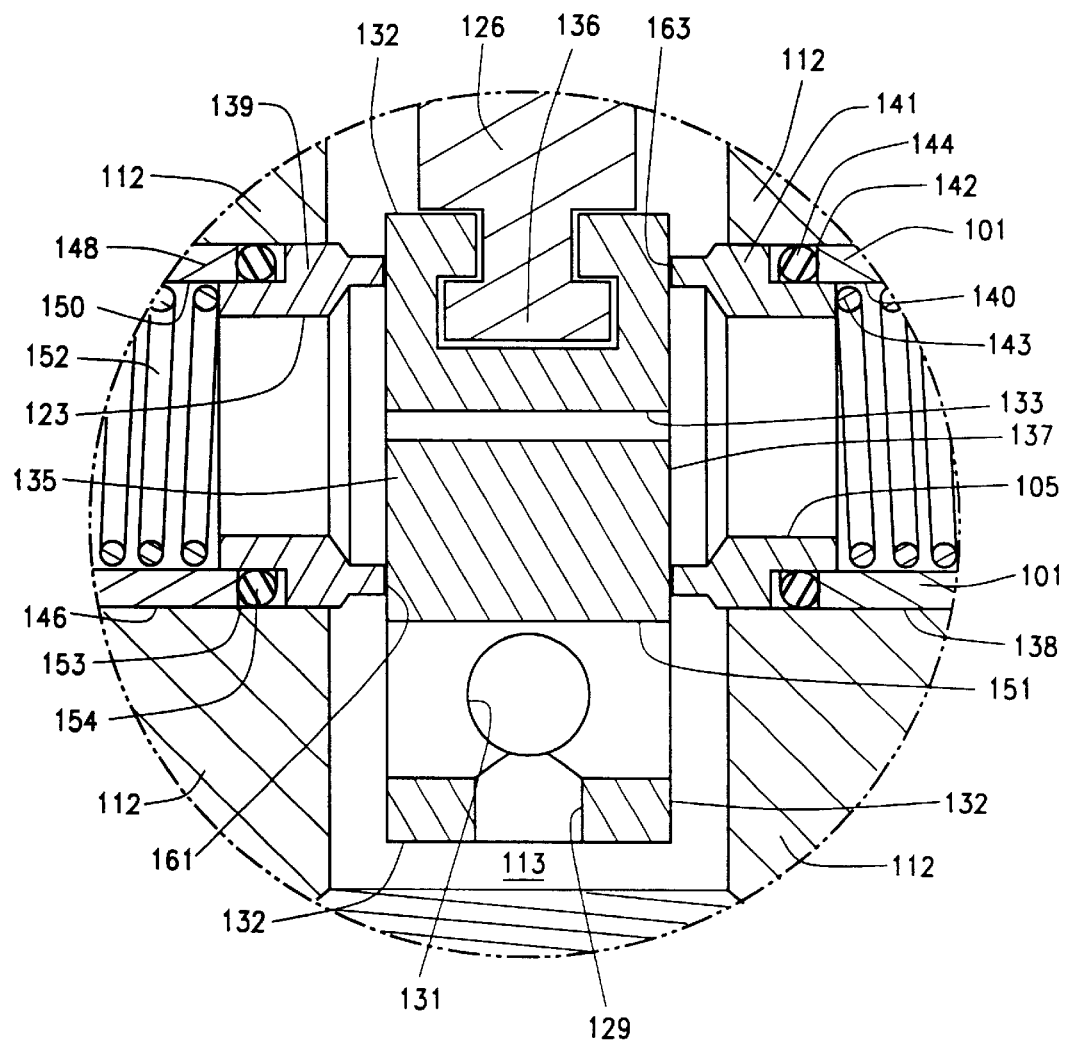
FIG. 4 is an enlarged section view of the gate and seal assembly of FIG. 3. The valve is shown in the closed position.

Referring to FIGS. 3 and 4, the relief valve 100 has approximately twice as much flow capacity as the prior art relief valve 20 of U.S. Pat. No. 4,456,028 at the same pressure. Valve 100 has a blowdown dead band of approximately 15–20%. The body 112 defines a spring cavity 111 on one end and an inlet 102 on the other end. In the center of the body is a central flow passageway 113.

The adjusting cap 114 threadably engages the body 112 and can be rotated both clockwise and counterclockwise. In order to rotate the adjusting cap 114, the lock nut 116 must be loosened up. A plug 118 is positioned in a bore 119 in the top of the adjusting cap 114. A mainspring 120 sits on the spring follower 124, also referred to as a spring disk, inside the spring cavity 111. In order to raise the set point of the valve 100, the adjusting cap 114 is rotated clockwise to further compress the spring 120. In order to reduce the set point of the valve 100, the adjusting cap 114 is rotated counterclockwise to ease the compression of the spring 120. Those skilled in the art will recognize that the threads which connect the cap 114 and the body 112 can be formed as shown in FIG. 3 or the threads could be formed on the outside of the body 112 and the inside of the cap 114.

The plunger 126 has a rounded bevel on one end that contacts the spring follower 124 and a T-shaped head 136 on the opposite end that receives and carries the gate 132. The plunger 126 is sized and arranged to move axially in a bore 127 of the body 112. A groove 128 is formed about the outside circumference of the plunger 126. An o-ring 130 is positioned in the channel 128 and forms a seal between the plunger 126 and the body 112. A portion of the plunger 126 moves axially in the central flow passage 113 of the body 112.

The gate 132 has a T-shaped slot 125 formed in one end and a through bore 151 in the other end. The T-shaped head 136 is sized and arranged to engage the T-shaped slot 125 so the plunger 126 and the gate 132 move up and down in tandem. At the bottom of the gate 132 is another bore 129 that is in fluid communication with the central flow passageway 113 and the through bore 151. A cross bore 131 is also formed in the bottom of the gate 132. The cross bore 131 is in fluid communication with the through bore 151. Near the T-shaped slot 125 is another through bore 133 that is used to balance pressure across the gate 132. On one side of the gate 132 is a first flat sealing surface 135 and on the opposite side is a second flat sealing surface 137. The sealing surfaces 135 and 137 are lapped to a flat finish sufficient to effect a seal with the seal rings 139 and 141.

Outlet 109 is defined by a first flange 110 and is secured to the body 112 by a plurality of bolts, not shown. The first flange 110 is secured to the body 112 in the same fashion as the flange 104 is secured to the body 112. Outlet 103 is defined by a second flange 104, which is secured by a plurality of bolts 105, 106, 107 and 108 to the body 112. The outlets 109 and 103 are opposing and coaxial; they are likewise vented to atmosphere. A groove 80 is formed on the interior face of flange 104 and o-ring 82 is positioned in groove 80. The o-ring 82 makes a seal between the body 112 and the flange 104. Likewise a groove 84 is formed on the interior face of a first flange 110 and o-ring 86 is positioned in groove 84. The o-ring 86 makes a seal between the body 112 and the first flange 110.

A stepped bore 146 is formed in the body 112 and is sized and arranged to receive an adapter 148. The first flange 110 holds the adapter 148 in position in the stepped bore 146. A through bore 150 is formed in the adapter 148 and is in fluid communication with the outlet 109. A spring 152 is positioned in the through bore 150 and is captured between the flange 110 and the first seal ring 139. The spring 152 urges the first seal ring 139 into contact with the sealing surface 135 of the gate 132. The spring 152 can have a spring rate of approximately 30 lbs./in. Other spring rates may also be used in the invention provided that they do not create excess friction between the gate 132 and the seal rings 139. A pocket 153 is defined by the first seal ring 139, the adapter 148 and the stepped bore 146. O-ring 154 is positioned in the pocket 153 and forms a seal between the first seal ring 139 and the body 112.

A stepped bore 138 is formed in the body 112 and is sized and arranged to receive an adapter 101. The flange 104 holds the adapter 101 in position in the stepped bore 138. A through bore 140 is formed in the adapter 101 and is in fluid communication with the outlet 103. A spring 143 is positioned in the through bore 140 and is captured between the flange 104 and the second seal ring 141. The spring 143 urges the second seal ring 141 into contact with the sealing surface 137 of the gate 132. The spring 143 can have a spring rate of approximately 30 lbs./in. Other spring rates may also be used in the invention provided that they do not create excess friction between the gate 132 and the second seal ring 141. A pocket 142 is defined by the second seal ring 141, the adapter 101 and the stepped bore 138. O-ring 144 is positioned in the pocket 142 and forms a seal between the second seal ring 141 and the body 112.

Figure 18:
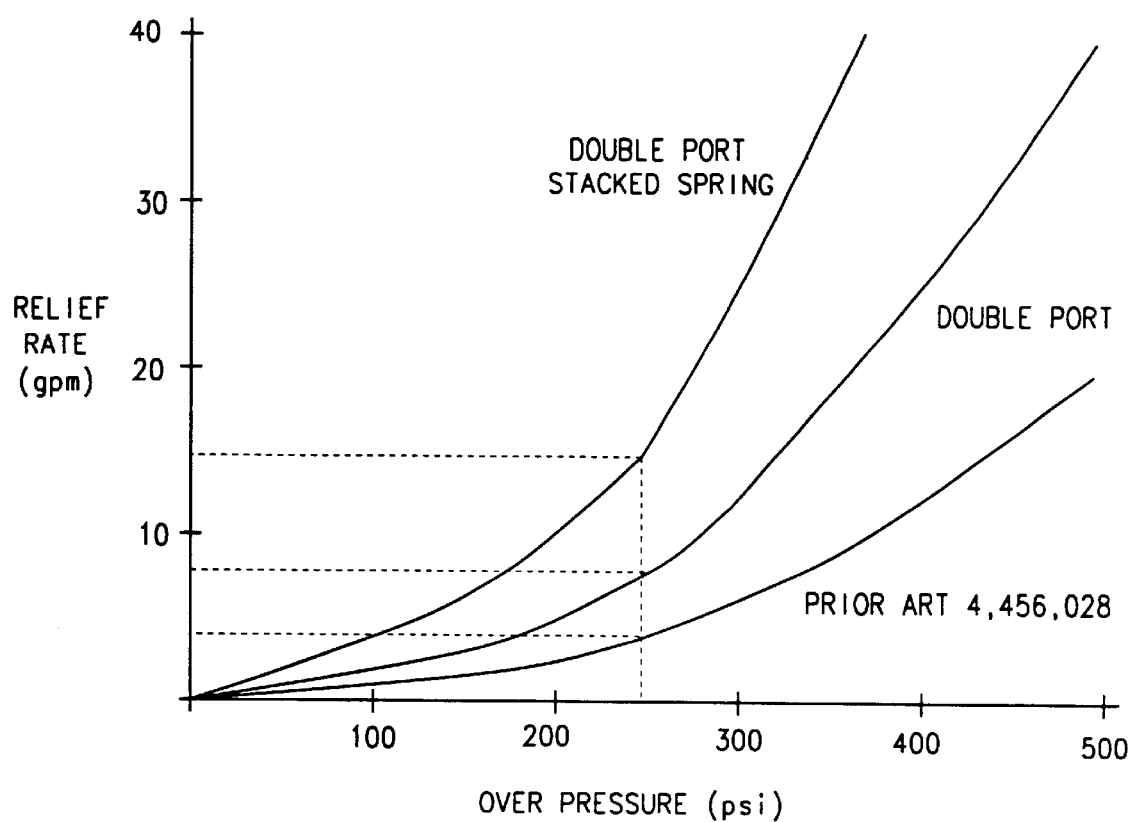
FIG. 18 is a graph comparing the relative flow rates of the prior art valve of U.S. Pat. No. 4,456,028, the double port relief valve of FIGS. 2–15 and the dual port stacked spring relief valve of FIGS. 16 and 17.

The valve 100 is shown in the closed position in FIGS. 3 and 4. When pressure in the inlet 102 reaches the set pressure, the lifting force being exerted on the gate 132 and the plunger 126 forces the spring 120 to compress allowing the gate 132 and the plunger 126 to move towards the adjusting cap 114. As the gate 132 moves the valve 100 cracks open and begins to relieve overpressure. When the valve 100 cracks open, there is a slight overlap between the bore 151 of the gate 132 and the bore 123 of seal ring 139 and bore 105 of seal ring 141. This overlap defines a flow area through which the fluid passes from the inlet 102 to the outlets 103 and 109. As the pressure in the inlet 102 rises, the spring 120 is further compressed and the gate 132 rises further in the central passageway 113. The area of the overlap increases and the flow area for the fluid likewise increases. As the area of overlap increases the relief rate (in gpm) from the outlets 103 and 129 also increases. As overpressure rises the spring 120 will reach a maximum degree of compression and the valve 100 will be full open. After this point, further increase in the relief capacity only results from a further increase in pressure. The effect is relatively minor by comparison to increase in flow area. Hopefully, the relief rate (in gpm) will be sufficient to abate the overpressure. However, if system overpressure continues to rise the system could fail because of insufficient relief valve capacity. It therefore becomes of great advantage to have relief valves with higher relief rates (in gpm). The present invention has relief rates that are double the prior art valve, FIG. 1, at the same overpressure. FIG. 18 graphically compares the relief rates of the prior art and the present invention. FIG. 18 illustrates the advantage of increasing flow capacity (i.e. relief rate in gpm) through the relief valve. This allows fluid to flow from the inlet 102 through the central passageway 113 through the bores 129, 151 and 131. Fluid then passes through the passageway 123 in the first seal ring 139, through the bore 150 in the adapter 148 to the outlet 109. Fluid also passes through the passageway 105 in the second seal ring 141, through the bore 140 in the adapter 101 to the outlet 103. Both outlets 103 and 109 are vented to atmosphere. In this fashion, excess pressure is relieved from the piping system, pressure vessel or other system, thus reducing the chance of damage to the system, the environment or personnel. When the system pressure falls below the set point, as determined by the blowdown dead band, the valve 100 will close and the gate 132 and plunger 126 will move downward in response to spring forces into the closed position, as shown in FIG. 3.

Those skilled in the art will recognize that springs are generally manufactured with different degrees of flexibility, which is typically expressed as spring rate in pounds per inch. In order to achieve different set pressure ranges for the valve 100, springs with different degrees of flexibility will be placed in the valve 100. For example, the following set pressure ranges expressed in psi could be achieved using a mainspring with different spring rates, for a ¾ inch relief valve 100:

| Set Pressure | Spring Rate |
| --- | --- |
| 150–500 psi | 165 lb./in. |
| 500–1,250 psi | 250 lb./in. |
| 1,250–1,850 psi | 400 lb./in. |
| 1,850–4,500 psi | 990 lb./in. |
| 4,500–5,500 psi | 1,290 lb./in. |

Thus, selection of the mainspring 120 is determined by the set pressure range for a given application. If a higher set pressure range is required, two nested springs are used as shown in FIG. 6. Springs 120 and 230 have a combined spring rate of approximately 1,497 lb./in. in order to achieve a set pressure range of approximately 5,500–6,500 psi. Other set pressures can be achieved with springs of different rates.

The prior art relief valve 20 may be retrofitted or converted into the double port relief valve 100, 200, 300, 400 or the dual port stacked spring relief valve 500, shown in FIGS. 16 and 17. In order to make the conversion, the valve 20 is sent back to the plant where the body 22 of the prior art design (FIG. 1) is modified into the body 112 of the present invention by machining a second outlet bore 146, modifying the first bore 138 and adding holes, not shown, to receive bolts, not shown, to secure the second flange 110 to the body 112. The internal components of the prior art valve 20 are discarded and new internal components are installed, including the plunger 126, gate 132, seal rings 139 and 141, adapters 101 and 148, springs 143 and 152 and o-rings 144, 154 and 130. If the prior art valve 20 is to be converted into a stacked spring version as shown in FIG. 17, the following additional components are added; spring 415, spring follower 418, and adjusting sleeve 410.

FIG. 4 is an enlarged section view of the gate 132 in FIG. 3 and seal rings 139 and 141. FIG. 4 shows the valve 100 and the gate 132 in the closed position. The first seal ring 139 is urged by the spring 152 into contact with the sealing surface 135 on the gate 132. The second seal ring 141 is urged by the spring 143 into contact with the sealing surface 137 on the gate 132. Cross bore 133 balances pressure across the gate 132.

Sealing surface 161 of the first seal ring 139 slides across the sealing surface 135 of gate 132 when the valve moves from the closed to the open position and vice versa. Sealing surface 161 and sealing surface 135 are lapped to a flat finish sufficient to effect a seal. Sealing surface 163 of second seal ring 141 slides across sealing surface 137 of gate 132 when the valve moves from the closed to the open position and vice versa. Sealing surface 163 and sealing surface 137 are lapped to a flat finish sufficient to effect a seal. In the preferred embodiment, the seal rings 139 and 141 are metal and the gate 132 is likewise metal. These metal components achieve a seal because of the pressurized fluid from the central flow passageway 113 which enters the bores 146 and 138 of the body 112, applying pressure to a portion of the rear surface of each first seal ring 139 and 141 to achieve a fluid-tight metal-to-metal seal with respect to sealing surfaces 135 and 137 as discussed in greater detail in the next figure.

Figure 5:
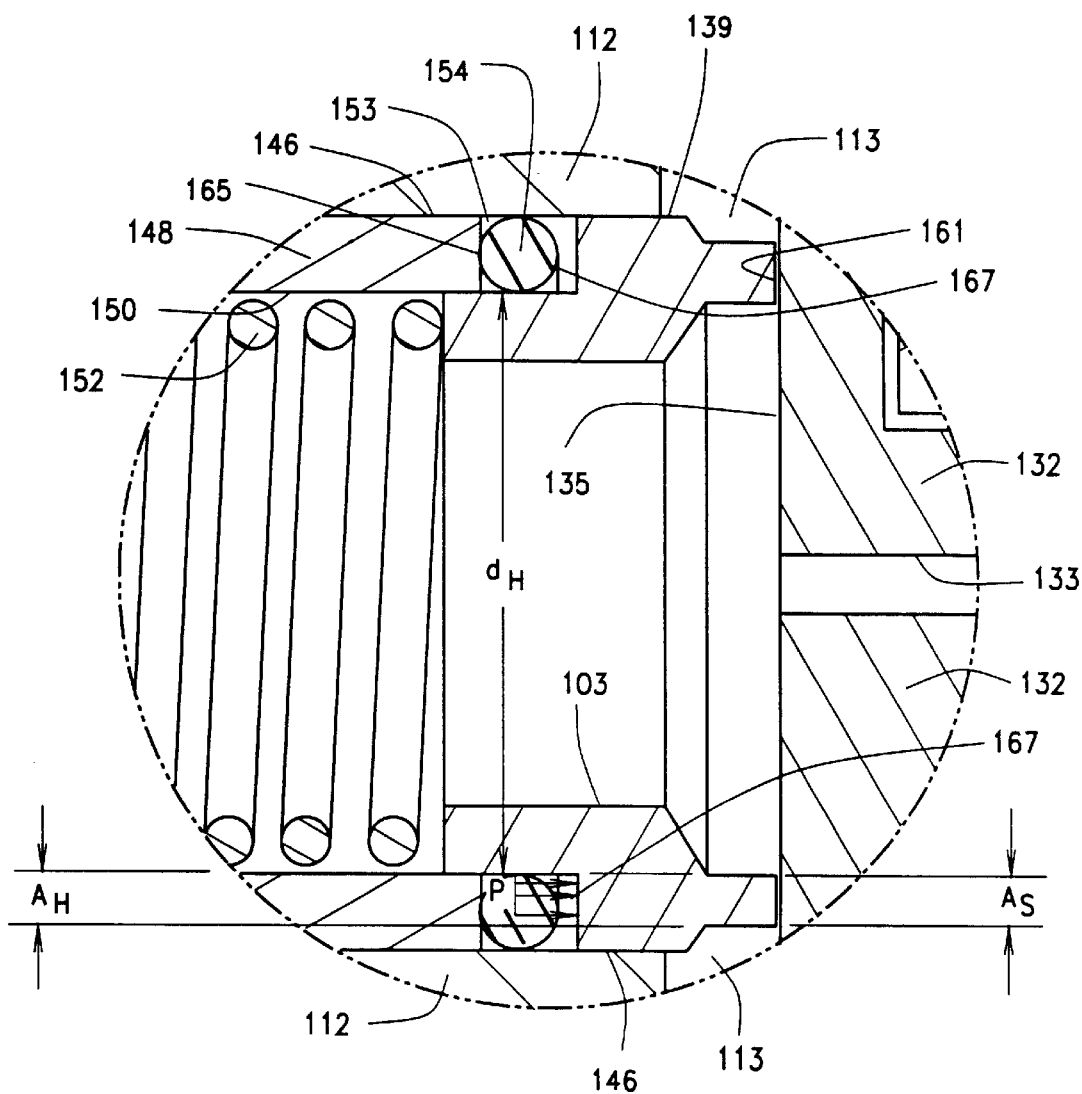
FIG. 5 is an enlargement of one seal ring of FIG. 3 and a portion of the gate. The valve is shown in a closed position.

FIG. 5 is an enlarged section view of the first seal ring 139 and a portion of the gate 132 of FIG. 4. An important characteristic of relief valves is the ability to achieve a fluid-tight seal. One way to determine the sealing capability of a relief valve is to calculate the ratio of the total hydraulic area to the seal contact area. The total hydraulic area is the annular area indicated by the arrows $A_H$. The total hydraulic area is the annular area on the rear of the first seal ring 139 against which hydraulic pressure is applied as indicated by the Arrows P. This hydraulic pressure moves through the central flow passageway 113 and the bore 146 forcing the o-ring 154 in the pocket 153 against the end portion 165 of the adapter 148. The hydraulic pressure then acts on shoulder 167 of the first seal ring 139 urging sealing surface 161 of first seal ring 139 into sealing contact with sealing surface 135 of gate 132. In this drawing, the seal contact area is designated by the arrows $A_S$. If the ratio of the total hydraulic area $A_H$ to the seal contact area $A_s$ falls below approximately 0.6, then the seals may leak. However, the larger this ratio the greater is the detrimental effect on relief capacity and blowdown dead band. It is therefore desirable to minimize the ratio of the total hydraulic area $A_H$ to the seal contact area $A_s$, provided that a good seal can still be established. In the design illustrated in FIGS. 3–5, the ratio of the total hydraulic area to the total seal contact area is 1. If the pressure in the flow passageway 113 is 5,000 psi, the contact pressure applied to the first seal ring 139 is 5,000 psi.

(5,000×1=5,000.) These forces will assure a tight metal-to-metal seal. Applicants suggest that with good surface finish and flatness the ratio of total hydraulic area $A_H$ to seal contact area $A_S$ be in the range of 0.6 to 1.0. Ratios lower than 0.6 may not achieve a good seal. The higher this ratio is, the greater the friction and the higher the blowdown dead band. In the prior art design of FIG. 1, the ratio of the total hydraulic area to the total seal contact area is approximately 3.3. The reduction of this ratio in the present invention from approximately 3.3 to approximately 1 likewise reduces friction and the blowdown dead band from approximately 20% to approximately 15–20% in the valve 100. If seal friction was not reduced by the present invention, simply adding a second outlet port would be impractical because blowdown dead band would be extreme (approximately 40%). When the ratio of the total hydraulic area to the total seal contact area is one or less the design is said to be "balanced."

FIG. 6 is a section view of the relief valve 100, except an interior spring 230 has been nested inside the mainspring 120. The purpose of adding the interior spring 230 is to increase the set pressure range of the relief valve 100. The combined spring rate of mainspring 120 and interior spring 230 is approximately 1497 lb./in. This spring configuration will allow the relief valve 100 to achieve a set pressure range of approximately 5,500 to 6,500 psi.

Referring to FIGS. 7 and 8, the relief valve 200 is identical to the relief valve 100 shown in FIGS. 3, 4 and 5 except an alternative embodiment is shown for the seal rings, the adapters and some of the bores in the valve. Relief valve 200 has approximately twice as much flow capacity as the prior art relief valve 20 of U.S. Pat. No. 4,456,028 at the same pressure. Relief valve 200 has a blowdown dead band of approximately 15–20%. A stepped bore 238 is formed in the body 112 and is sized and arranged to receive an adapter 201. The flange 104 holds the adapter 201 in position in the stepped bore 238. A through bore 240 is formed in the adapter 201 and is in fluid communication with the outlet 103. A spring 243 is positioned in the through bore 240 and is captured between the flange 104 and the seal ring 141. The spring 243 urges the seal ring 241 into contact with the sealing surface 137 of the gate 132. The spring 243 can have a spring rate of approximately 40 lb./in. Other spring rates may also be used in the invention provided that they do not create excess friction between the gate 132 and the seal ring 241. A pocket 242 is defined by the seal ring 241, the adapter 201 and the stepped bore 238. O-ring 244 is positioned in the groove 242 and forms a seal between the seal ring 241 and the body 112.

A stepped bore 246 is formed in the body 112 and is sized and arranged to receive an adapter 248. The first flange 110 holds the adapter 248 into position in the stepped bore 246. A through bore 250 is formed in the adapter 248 and is in fluid communication with the outlet 109. A spring 252 is positioned in the through bore 250 and is captured between the flange 110 and the seal ring 239. The spring 252 urges the seal ring 239 into contact with the sealing surface 135 of the gate 132. The spring 252 can have a spring rate of 40 lb./in. Other spring rates may also be used in the invention provided that they do not create excess friction between the gate 132 and the seal ring 239. A pocket 253 is defined by the seal ring 239, the adapter 248 and the stepped bore 246. O-ring 254 is positioned in the pocket 253 and forms a seal between the seal ring 239 and the body 112.

The valve 200 is shown in the closed position in FIGS. 7 and 8. When the pressure in the inlet 102 reaches the set pressure, the lifting force being exerted on the gate 132 and the plunger 126 forces the spring 120 to compress thus moving the gate 132 and the plunger 126 upward. When the gate 132 moves from the closed position as shown in FIG. 3 and FIG. 4 to the partially open position, not shown, the through bore 127 in the gate 132 partially overlaps the through bore of the seal rings 239 and 241. The valve is said to be "cracked open". This allows fluids to flow from the inlet 102 to the central passageway 113 through bores 129, 127 and 131. Fluid then passes through the passageway 205 in the seal ring 241, through the bore 240 and the adapter 201 to the outlet 103. Fluid also passes through the passageway 203 in the seal ring 239, through the bore 250 in the adapter 248 to the outlet 109. Overpressure must substantially exceed the set pressure for the valve 200 to move to the full open position, not shown.

Both outlets 103 and 109 are vented to atmosphere. In this fashion, excess pressure is relieved from the piping system, pressure vessel or other system, thus reducing the chance of damage to the system, the environment or personnel. After the valve 200 has relieved the excess pressure from the system, the valve 200 will close and the gate 132 and the plunger 126 will move downward in response to spring forces into the closed position, as shown in FIG. 6.

As previously described in connection with relief valve 100, a variety of different springs with different spring rates will be used in the relief valve 200 for various set pressures. The same springs will be used for relief valve 200 as previously described for relief valve 100. The prior art relief valve 20 may be retrofitted or converted into the double port relief valve 200 as previously described.

FIG. 8 is an enlarged view of the gate 132 and the seal rings 241 and 239 from FIG. 7. FIG. 8 shows the valve 200 and the gate 132 in the closed position. The seal ring 241 is urged by the spring 243 into contact with the sealing surface 137 on the gate 132. The seal ring 239 is urged by the spring 252 into contact with the sealing surface 135 on the gate 132. Cross bore 133 balances pressure across the gate 132. The seal rings 241 and 239 are slightly larger in size than the seal rings 141 and 139. Smaller seal rings mean the gate and the body can likewise be smaller. For this reason, the valve 100 is more economical to produce then the valve 200. This likewise applies to the other valves described below.

Sealing surface 261 of seal ring 239 slides across sealing surface 131 of the gate 132 when the valve moves from the closed to the open position and vice versa. Sealing surface 261 and sealing surface 135 are lapped to a flat finish sufficient to effect a seal. Sealing surface 263 of seal ring 241 slides across sealing surface 137 of gate 132 when the valve moves from the closed to the open position and vice versa. Sealing surface 263 and sealing surface 137 are lapped to a flat finish sufficient to effect a seal. In the preferred embodiment, the seal rings 239 and 241 are metal and the gate 132 is likewise metal. These metal components achieve a seal primarily because of the pressurized fluid from the central flow passageway 113 which enters bores 246 and 238 of the body 112 applying pressure to a portion of the rear surface of each seal ring 239 and 241 to achieve a fluid type metal-to-metal seal with respect to sealing surfaces 135 and 137 as discussed in greater detail in the next figure.

FIG. 9 is an enlarged section view of the seal ring 239 and a portion of the gate 132 of FIG. 8. An important characteristic of relief valves is the ability to achieve a fluid-tight seal. One way to determine the sealing capability of a relief valve is to calculate the ratio of the total hydraulic area to the seal contact area. The total hydraulic area is indicated by the arrows $A_H$. The total hydraulic area is the annular area on the rear of the seal ring 239 against which hydraulic pressure is applied as indicated by the arrows P. This hydraulic pressure moves through the central flow passageways 113 and the bore 250 forcing the o-ring 254 in the pocket 253 against the shoulder 265 of the seal ring 239. The hydraulic pressure then acts on the shoulder 267 of the seal ring 239 urging sealing surface 261 of seal ring 239 into sealing contact with sealing surface 135 of the gate 132.

In FIG. 9, the seal contact area is designated by the arrows $A_S$. If the ratio of the total hydraulic $A_H$ to the seal contact area $A_S$ falls below approximately 0.6, then the seals may leak. However the larger this ratio the greater is the detrimental effect on relief capacity and blowdown dead band. It is therefore desirable to minimize the ratio of the total hydraulic area $A_H$ to the seal contact area $A_S$, provided that a good seal can still be established. In the valve 200 illustrated in FIGS. 7 through 9, the ratio of the total hydraulic area to the total seal area is about 1. If the pressure in the flow passageway 113 is 5,000 psi, the contact pressure applied to the seal ring 239 is 5,000 psi. (5,000×1=5,000 psi.). These forces will assure a tight metal-to-metal seal. Applicant suggests that the ratio of total hydraulic area $A_H$ to total seal contact area $A_S$ be in the range of 0.6 to 1.0. Ratios lower than 0.6 may not achieve a good seal. Ratios above 1.0 may adversely affect blowdown dead band.

Referring now to FIG. 10 and FIG. 11. FIG. 10 is a section view of an alternative embodiment of double port relief valve 300. FIG. 11 is an enlarged section view of the seal assembly 232 in the closed position. The relief valve 300 has approximately twice as much flow capacity as the prior art relief valve 20 of U.S. Pat. No. 4,456,028 at the same pressure. Valve 300 has a blowdown dead band of approximately 15–20%. The body 212 defines a spring cavity 211 on one end and an inlet 202 on the other end. In the center of the body is a central flow passageway 213.

The adjusting cap 214 threadably engages the body 212 and can be rotated both clockwise and counterclockwise. In order to raise the set point of the valve 300, the adjusting cap 214 is rotated clockwise to further compress the spring 220. In order to reduce the set point of the valve 300, the adjusting cap 214 is rotated counterclockwise to ease the compression of the spring 220. Those skilled in the art will recognize that the threads 199 which connect the cap 214 and the body 212 can be formed as shown in FIG. 3 or the threads could be formed on the outside of the body 212 and the inside of the cap 214.

The elongate seal carrier 226 has a rounded bevel on one end that contacts the spring follower 224 and a transverse bore 236 on the opposite end that receives and carries the seal assembly generally identified by the numeral 232. A portion of the elongate seal carrier 226 is sized and arranged to move axially in a bore 227 of the body 212. A groove 228 is formed about the outside circumference of the seal carrier 226. An o-ring 230 is positioned in the groove 228 and forms a seal between the seal carrier 226 and the body 212. A portion of the seal carrier 226 moves axially in the central flow passage 213 of the body 212.

Outlet 203 is defined by a first flange 204, which is secured by a plurality of bolts, not shown, to the body 212. Outlet 209 is defined by the flange 210 and is likewise secured to the body 212 by a plurality of bolts, not shown. The flanges 204 and 210 are secured to the body 212 in the same fashion as the flange 104 is secured to the body 112. The outlets 203 and 209 are opposing and coaxial; they are likewise vented atmosphere.

A bore 238 is formed in the body 212 and is sized and arranged to receive first seal plate 239. A through bore 240 is formed in the first seal plate 239 and is in fluid communication with the outlet 203. A groove 242 is formed in the outer circumference of the seal plate 239. An o-ring 244 is positioned in the groove 242 to achieve a seal between the seal plate 239 and the body 212.

A bore 246 is formed in the body 212 and is sized and arranged to receive a second seal plate 248. A through bore 250 is formed in the seal plate 248 and is in fluid communication with the outlet 209. A groove 252 is formed in the outer circumference of the seal plate 248. An o-ring 254 is positioned in the channel 252 to achieve a seal between the seal plate 248 and the body 212.

The valve 300 is shown in the closed position in FIG. 10. When pressure in the inlet 202 reaches the set pressure, the lifting force being exerted on the seal-carrier 226 forces the spring 220 to compress, thus disengaging the seal assembly 232 from the bores 240 and 250. This allows fluid to flow from the inlet 202 through the central flow passageway 213 through the partially open bore 240 to the first outlet 203 and through the other partially open bore 250 to the second outlet 209. The valve is said to be "cracked open". Both outlets 203 and 209 are vented to atmosphere. In this fashion, excess pressure is relieved from the piping system, pressure vessel or other system, thus reducing the chance of damage to the system, the environment or personnel. When the system pressure falls below the set point, as determined by the blowdown dead band, the valve 300 will close and the seal carrier 226 will move downward in response to spring forces into the closed position, as shown in FIG. 10.

Those skilled in the art will recognize that springs are generally manufactured with different degrees of flexibility, which is typically expressed as spring rate in pounds per inch. In order to achieve different set pressure ranges for the valve 300, springs with different degrees of flexibility will be placed in the valve 300. For example, the following set pressure ranges expressed in psi could be achieved using a mainspring with different spring rates, for a ¾ inch relief valve 300:

| Set Pressure | Spring Rate |
| --- | --- |
| 150–500 psi | 165 lb./in. |
| 500–1,250 psi | 250 lb./in. |
| 1,250–1,850 psi | 400 lb./in. |
| 1,850–4,500 psi | 990 lb./in. |
| 4,500–5,500 psi | 1,290 lb./in. |

Thus, selection of the mainspring 220 is determined by the set pressure range for a given application. If a higher set pressure range is required, two nested springs are used as shown in FIG. 6. Springs 120 and 230 have a combined spring rate of approximately 1,497 lb./in. in order to achieve a set pressure range of approximately 5,500–6,500. Other set pressures can be achieved with springs of different rates.

The prior art relief valve 20 may be retrofitted or converted into the double port relief valve 300 or the dual port stacked spring relief valve 500, shown in FIGS. 16 and 17. In order to make the conversion, the valve 20 is sent back to the plant where further machining takes place. The conversion process is similar to the retrofit process described in connection with Valve 100.

FIG. 11 is an enlarged section view of the seal assembly 232 of FIG. 10. FIG. 11 shows the valve 300 and the seal assembly 232 in the closed position. The seal carrier 226 has shoulder 245 formed about the exterior, which contacts seal plates 239 and 248. Shoulder 245 engages the seal 239 and 248 and stops the downward travel of the seal carrier 226 in response to urging by the spring 220. The first seal plate 239 is positioned in bore 238 of the body 212. Groove 242 receives o-ring 244 to achieve a seal between the first seal plate 239 and the body 212. Bore 246 in body 212 receives a second seal plate 248. Groove 252 receives o-ring 254 to achieve a seal between the second seal plate 248 and the body 212.

The seal assembly 232 includes a first seal ring 256, a second seal rings 258, a seal spring 260 and a pair of o-rings 278 and 288. As shown in FIG. 11, the first seal ring 256 has a flat sealing surface 258 that contacts sealing surface 260 on seal plate 239. Likewise, the second seal ring 258 has a flat sealing surface 262 that contacts the flat sealing surface 264 on the second seal plate 248. The spring 261 urges the first seal ring 256 and the second seal ring 258 into contact with sealing surfaces 260 and 264, respectively. A typical spring rate for spring 260 is approximately 35 lb./in. In the preferred embodiment, the seal rings 256 and 258 and the seal plates 239 and 248 are 40c steel or tungsten carbide.

Opposing enlarged recesses 266 and 268 are formed on each end of the transverse bore 236, seal ring 256 has a first step 270 connected by a shoulder 272 to a second step 274. The first step 270 slides in recess 266 and the second step 274 slides in the transverse bore 236. A through bore 276 is formed in the center of the seal ring 270. An o-ring 278 is trapped in a pocket 280 defined by the shoulder 272, the second step 274, and the recess 266. O-ring 278 forms a seal between the seal ring 256 and the seal carrier 226.

Seal ring 258 has a first step 280 connected by a shoulder 282 to a second step 284. The first step 282 is larger in diameter than the second step 284. The first stop 270 slides in the recess 268 and the second step 284 slides in the transverse bore 236. A through bore 286 is formed in the center of the seal ring 258. An o-ring 288 is trapped in a pocket 290 defined by the shoulder 282, the second step 284 and the recess 268. O-ring 288 forms a seal between the seal ring 258 and the seal carrier 226.

A flat sealing surface 258 is formed on one end of the seal ring 256 and a flat sealing surface 262 is formed on one end of the seal ring 258. Sealing surface 258 contacts sealing surface 260 of seal plate 239 and sealing surface 362 contacts sealing surface 264 of seal plate 248 as a result of the spring force exerted by seal spring 260 on the seal rings 256 and 258. Sealing surfaces 292, 294, 260 and 264 are lapped to a flat finish sufficient to effect a seal. However, the seal is achieved not because of the spring 260, but because of pressure forces better described in the next Figure.

FIG. 12 is an enlarged section view of the second seal ring 258 and a portion of the second seal plate 248 of FIG. 11. An important characteristic of relief valves is the ability to achieve a fluid-tight seal. One way to determine the sealing capability of a relief valve is to calculate the ratio of the total hydraulic area to the total seal contact area. In this drawing the total hydraulic area is designated by the arrows $A_H$. The seal contact area is designated by the arrows $A_S$. If the ratio of the total hydraulic area $A_H$ to the total seal contact area $A_S$ falls below approximately 0.6, then the seals may leak. However if this ratio is too large, then the relief capacity and blowdown dead band will likewise be adversely affected. It is therefore desirable to minimize the ratio $A_H/A_S$ provided that a good seal can still be established. In this particular design, the ratio of the total hydraulic area to the total seal contact area is 1.0. It is desirable to keep this ratio between about 0.6 and 1.0. The seal rings 256 and 258 achieve a seal with the opposing seal plates 239 and 248 because of the pressurized fluid from the central flow passageway 213, which enters recesses 266 and 268 of the seal carrier 226, applying force to a portion of the shoulder 272 of seal ring 256 and to a portion of the shoulder 282 of the seal ring 256 (as indicated by the arrows labeled P), to achieve a fluid-tight, metal to metal seal. The pressurized fluid forces the o-ring 288 away from the shoulder 282 in the pocket 290.

FIG. 13 is a section view of an alternative embodiment of the double port relief valve 400. The alternative embodiment 400 of FIGS. 13, 14 and 15 is similar in design to the relief valve 300 of FIGS. 10, 11 and 12 except the elongate seal carrier 326 has a different configuration from the seal carrier 226. The primary difference between valve 300 and valve 400 is the seal assembly 232 and 332. The relief valve 400 has approximately twice as much flow capacity as the prior art relief valve 20 of U.S. Pat. No. 4,456,028 at the same pressure. Valve 400 has a blowdown dead band of approximately 15–20%. The body 312 defines a spring cavity 311 on one end and an inlet 302 on the other end. In the center of the body is a central flow passageway 313.

The adjusting cap 314 threadably engages the body 312 and can be rotated both clockwise and counterclockwise. In order to raise the set point of the valve 400, the adjusting cap 314 is rotated clockwise to further compress the spring 320. In order to reduce the set point of the valve 300, the adjusting cap 314 is rotated counterclockwise to ease the compression of the spring 320. Those skilled in the art will recognize that the threads 301 which connect the cap 314 and the body 312 can be formed as shown in FIG. 3 or the threads could be formed on the outside of the body 312 and the inside of the cap 314.

The elongate seal carrier 326 has a rounded bevel on one end that contacts the spring follower 324 and a transverse bore 336 on the opposite end that receives and carries the seal assembly generally identified by the numeral 332. A portion of the elongate seal carrier 326 is sized and arranged to move axially in a bore 327 of the body 312. A channel 380 is formed about the outside circumference of the seal carrier 326. An o-ring 330 is positioned in the channel 328 and forms a seal between the seal carrier 326 and the body 312. A portion of the seal carrier 326 moves axially in the central flow passage 313 of the body 312.

Outlet 303 is defined by a first flange 304, which is secured by a plurality of bolts 305, 306, 307 and 308 to the body 312. Outlet 309 is defined by the flange 310 and is likewise secured to the body 312 by a plurality of bolts, not shown. The flanges 304 and 310 are secured to the body 312 in the same fashion as the flange 104 is secured to the body 112. The outlets 303 and 309 are opposing and coaxial; they are likewise vented atmosphere.

A bore 338 is formed in the body 312 and is sized and arranged to receive first seal place 339. A through bore 340 is formed in the first seal plate 339 and is in fluid communication with the outlet 303. A channel 342 is formed in the outer circumference of the seal plate 339. An o-ring 344 is positioned in the channel 342 to achieve a seal between the seal plate 339 and the body 312.

A bore 346 is formed in the body 312 and is sized and arranged to receive a second seal plate 348. A through bore 350 is formed in the seal plate 348 and is in fluid communication with the outlet 309. A channel 352 is formed in the outer circumference of the seal plate 348. An o-ring 354 is positioned in the channel 352 to achieve a seal between the seal plate 348 and the body 312.

The valve 400 is shown in the closed position in FIG. 13. When pressure in the inlet 302 reaches the set pressure, the lifting force being exerted on the seal-carrier 326 forces the spring 320 to compress, thus disengaging the seal assembly 332 from the bores 340 and 350. This allows fluid to flow from the inlet 302 through the central flow passageway 313 through the bore 340 to the first outlet 303 and through the other bore 350 to the second outlet 309. Both outlets 303 and 309 are vented to atmosphere. In this fashion, excess pressure is relieved from the piping system, pressure vessel or other system, thus reducing the chance of damage to the system, the environment or personnel. When the system pressure falls below the set point, as determined by the blowdown dead band, the valve 300 will close and the seal carrier 326 will move downward in response to spring forces into the closed position, as shown in FIG. 10.

Those skilled in the art will recognize that springs are generally manufactured with different degrees of flexibility, which is typically expressed as spring rate in pounds per inch. In order to achieve different set pressure ranges for the valve 400, springs with different degrees of flexibility will be placed in the valve 400. For example, the following set pressure ranges expressed in psi could be achieved using a mainspring with different spring rates, for a ¾ inch relief valve 300:

| Set Pressure | Spring Rate |
| --- | --- |
| 150–500 psi | 165 lb./in. |
| 500–1,250 psi | 250 lb./in. |
| 1,250–1,850 psi | 400 lb./in. |
| 1,850–4,500 psi | 990 lb./in. |
| 4,500–5,500 psi | 1,290 lb./in. |

Thus, selection of the mainspring 320 is determined by the set pressure range for a given application. If a higher set pressure range is required, two nested springs are used as shown in FIG. 6. Springs 320 and 99 have a combined spring rate of approximately 1,497 lb./in. in order to achieve a set pressure range of approximately 5,500–6,500. Other set pressures can be achieved with springs of different rates.

The prior art relief valve 20 may be retrofitted or converted into the double port relief valve 400 or the dual port stacked spring relief valve 500, shown in FIGS. 16 and 17. In order to make the conversion, the valve 20 is sent back to the plant where further machining takes place. The conversion process is similar to the retrofit process described in connection with valve 100.

FIG. 14 is an enlarged section view of the seal assembly 332 of FIG. 13. FIG. 14 shows the valve 400 and the seal assembly 332 in the closed position. The seal carrier 326 has shoulder 345 formed about the exterior, which contacts seal plates 339 and 348. Shoulder 345 engages the seal carriers 339 and 348 and stops the downward travel of the seal carrier 326 in response to urging by the spring 320. The first seal plate 339 is positioned in bore 338 of the body 312. Channel 342 receives o-ring 344 to achieve a seal between the first seal plate 339 and the body 312. Bore 346 in body 312 receives a second seal plate 348. Channel 352 receives o-ring 354 to achieve a seal between the second seal plate 348 and the body 312.

The seal assembly 332 includes a first seal ring 356, a second seal rings 358, a seal spring 360 and a pair of o-rings 378 and 388. As shown in FIG. 14, the first seal ring 356 has a flat sealing surface 358 that contacts sealing surface 360 on seal plate 339. Likewise, the second seal ring 358 has a flat sealing surface 362 that contacts the flat sealing surface 364 on the second seal plate 346. The spring 360 urges the first seal ring 356 and the second seal ring 358 into contact with sealing surfaces 360 and 364, respectively. A typical spring rate for spring 360 is approximately 30 lb./in. In the preferred embodiment, the seal rings 356 and 358 are metal and the seal plate 339 and 348 are likewise metal. Sealing surfaces 360, 364, 358 and 362 are lapped to a flat finish sufficient to effect a seal.

Seal ring 356 has a first step 370 connected by a slanting shoulder 372 to a second step 374. The second step 374 slides in the transverse bore 336. A through bore 376 is formed in the center of the seal ring 370. An o-ring 378 is positioned in an o-ring groove 380 formed in the second step 374. O-ring 378 forms a seal between the seal ring 356 and the seal carrier 326.

Seal ring 358 has a first step 380 connected by a slanting shoulder 382 to a second step 384. The first step 382 is larger in diameter than the second step 384. The second step 384 slides in the transverse bore 336. A through bore 386 is formed in the center of the seal ring 358. An o-ring 388 is positioned in an o-ring groove 390 formed in the second step 384. The o-ring groove 390 has first shoulder 391 and second opposing parallel shoulder 393. The other seal ring 356 is configured the same as seal ring 358. O-ring 388 forms a seal between the seal ring 358 and the seal carrier 326.

A flat sealing surface 358 is formed on one end of the seal ring 356 and a flat sealing surface 362 is formed on one end of the seal ring 358. Sealing surface 358 contacts sealing surface 360 of seal plate 339 and sealing surface 362 contacts sealing surface 364 of seal plate 348 as a result of the spring force exerted by seal spring 360 on the seal rings 356 and 358. Sealing surfaces 360, 364, 358 and 362 are lapped to a flat finish sufficient to effect a seal. However, the seal is achieved not because of the spring 360, but because of pressure forces better described in the next Figure.

FIG. 15 is an enlarged section view of the second seal ring 358 and a portion of the second seal plate 348 of FIG. 14. An important characteristic of relief valves is the ability to achieve a fluid-tight seal. One way to determine the sealing capability of a relief valve is to calculate the ration of the total hydraulic area to the total seal contact area. In this drawing the total hydraulic area is designated by the arrows $A_H$. The seal contact area is designated by the arrows $A_S$. If the ratio of the total hydraulic area $A_H$ to the total seal contact area $A_S$ falls below approximately, then the seals may leak. However if this ratio is too large, then the blowdown dead band will likewise be adversely affected. It is therefore desirable to minimize the ration of the total seal contact area $A_S$ provided that a good seal can still be established. In this particular design, the ratio of the total hydraulic area to the total seal contact area is 1.0. It is desirable to keep this ratio between about 0.6 and 1.0. The seal rings 356 and 358 achieve a seal with the opposing seal plates 339 and 348 because of the pressurized fluid from the central flow passageway 313, which enters transverse bore 326 of the seal carrier 326, applying force to a first o-ring groove shoulder 390 of seal ring 356 and to a first o-ring groove shoulder 395 of the seal ring 356 (as indicated by the arrows labeled P), to achieve a fluid-tight, metal to metal seal. The pressurized fluid forces the o-ring 388 away from the shoulder 391.

FIG. 16 is a section view of an alternative embodiment of the relief valve generally identified by the numeral 500. This valve is similar to the valve 100 shown in FIG. 3 except this embodiment has a pair of stacked springs 415 and 419. The relief valve 500 of FIGS. 16 and 17 has approximately 4 times as much flow capacity as the prior art relief valve 20 of U.S. Pat. No. 4,456,028 at the same pressure with a blowdown dead band of approximately 15–20%.

The relief valve 500 includes a body 112, which defines an inlet 102 and a spring cavity 111. The body further defines a central flow passageway 113 which allows fluid to flow from the inlet 102 through the body 112 to the outlets 103 and 109.

Adjusting cap 410 threadably engages intermediate adjusting sleeve 412. Both caps 410 and sleeve 412 have flats on the outside to facilitate rotation by a wrench or other means. A plug 118 is positioned in a bore 119 in the top of the adjusting cap 410.

Upper mainspring 415 is an elongate spring having a top 416 and a bottom 417. The top 416 engages the adjusting cap 410 and the bottom 417 engages a first spring follower 418.

The lower mainspring 419 is elongate having a top 420 and a bottom 421. The top 420 engages the spring follower 418 and the bottom 421 engages the second spring follower or spring disk 124.

Upper mainspring 415, spring follower 418, lower mainspring 419 and spring follower 124 are captured between the adjusting cap 410 and the seal carrier 126. Clockwise rotation of the adjusting cap 410 and/or the intermediate adjusting sleeve 412 compresses mainsprings 415 and 419. Likewise counter-clockwise rotation of the adjusting cap 410 and/or the intermediate adjusting sleeve 412 relaxes the mainsprings 415 and 419. The adjusting cap 410 and/or the intermediate adjusting sleeve 412 are rotated to adjust the set point of the valve. Once the appropriate set point has been achieved, lock nut 424 is rotated clockwise to lock the adjusting cap 410 against the intermediate adjusting sleeve 412. Likewise lock nut 426 is rotated clockwise to lock the intermediate adjusting sleeve 412 to the body 402.

The plunger 126 has a rounded bevel on one end that contacts the spring follower 124 and a T-shaped head 136 on the opposite end that receives and carries the gate 132. The plunger 126 is sized and arranged to move axially in a bore 127 of the body 112. A channel 128 is formed about the outside circumference of the plunger 126. An o-ring 130 is positioned in the channel 128 and forms a seal between the plunger 126 and the body 112. A portion of the plunger 126 moves axially in the central flow passage 113 of the body 112.

The gate 132 has a T-shaped slot 125 formed in one end and a through bore 127 in the other end. The T-shaped head 136 is sized and arranged to engage the T-shaped slot 125 so the plunger 126 and the gate 132 move up and down in tandem. At the bottom of the gate 132 is another bore 129 that is in fluid communication with the central flow passageway 113 and the through bore 127. A cross bore 131 is also formed in the bottom of the gate 132. The cross bore 131 is in fluid communication with the through bore 127. Near the T-shaped slot 125 is another through bore 133 that is used to balance pressure across the gate 132. On one side of the gate 132 is a first flat sealing surface 135 and on the opposite side is a second flat sealing surface 137. The sealing surfaces 135 and 137 are lapped to a flat finish sufficient to effect a seal with the seal rings 139 and 141. The arrangement of the flanges 104 ad 110 in FIG. 16 is identical to the arrangement of FIG. 1.

Outlet 109 is defined by a first flange 110 and is secured to the body 112 by a plurality of bolts, not shown. The first flange 110 is secured to the body 112 in the same fashion as the flange 104 is secured to the body 112. Outlet 103 is defined by a second flange 104, which is secured by a plurality of bolts 105, 106, 107 and 108 to the body 112. The outlets 109 and 103 are opposing and coaxial; they are likewise vented to atmosphere. A groove 80 is formed in the interior face of flange 104 and 0-ring 82 is positioned in groove 80. The o-ring 82 makes a seal between the body 112 and the flange 104. Likewise a groove 84 is formed on the interior face of a first flange 110 and o-ring 86 is positioned in groove 84. The o-ring 86 makes a seal between the body 112 and the first flange 110.

The sealing components described in the following paragraphs are identical to the sealing components of FIGS. 3–5. A stepped bore 146 is formed in the body 112 and is sized and arranged to receive an adapter 148. The first flange 110 holds the adapter 148 in position in the stepped bore 146. A through bore 150 is formed in the adapter 148 and is in fluid communication with the outlet 109. A spring 152 is positioned in the through bore 150 and is captured between the flange 110 and the first seal ring 139. The spring 152 urges the first seal ring 139 into contact with the sealing surface 135 of the gate 132. The spring 152 can have a spring rate of approximately 30 lbs./in. Other spring rates may also be used in the invention provided that they do not create express friction between the gate 132 and the first seal ring 139. A pocket 153 is defined by the first seal ring 139, the adapter 148 and the stepped bore 146. O-ring 154 is positioned in the pocket 153 and forms a seal between the first seal ring 139 and the body 112.

A stepped bore 138 is formed in the body 112 and is sized and arranged to receive an adapter 101. The flange 104 holds the adapter 101 in position in the stepped bore 138. A through bore 140 is formed in the adapter 101 and is in fluid communication with the outlet 103. A spring 143 is positioned in the through bore 140 and is captured between the flange 104 and the second seal ring 141. The spring 143 urges the second seal ring 141 into contact with the sealing surface 137 of the gate 132. The spring 143 can have a spring rate of approximately 30 lbs./in. Other spring rates may also be used in the invention provided that they do not create excess friction between the gate 132 and the second seal ring 141. A pocket 142 is defined by the second seal ring 141, the adapter 101 and the stepped bore 138. O-ring 144 is positioned in the pocket 142 and forms a seal between the second seal ring 141 and the body 112.

The valve 500 is shown in the closed position in FIG. 16. When pressure in the inlet 102 reaches the set pressure, the lifting force being exerted on the gate 132 and the plunger 126 forces the springs 415 and 419 to compress, thus aligning the through bore 127 causing a partial overlap between the bore 127 in the gate 132 and the through bore 105 of seal ring 141 and the through bore 123 of the seal ring 139. The valve 500 cracks open, and allows fluid to begin flowing from the inlet 102 through the central passageway 113 through the bores 129, 127, 131. Fluid then passes through the passageway 103 in the first seal ring 139, through the bore 150 in the adapter 148 to the outlet 109. Fluid also passes through the passageway 105 in the second seal ring 141, through the bore 140 in the adapter 101 to the outlet 103. Both outlets 103 and 109 are vented to atmosphere. As overpressure increases the amount of overlap between the bore 127 and the through bores 105 and 123 increases until the valve 500 reaches full open. In this fashion, excess pressure is relieved from the piping system, pressure vessel or other system, thus reducing the chance of damage to the system, the environment or personnel. When the system pressure falls below the set point, as determined by the blowdown dead band, the valve 500 will close and the gate 132 and plunger 126 will move downward in response to spring forces into the closed position, as shown in FIG. 3.

Those skilled in the art will recognize that springs are generally manufactured with different degrees of flexibility, which is typically expressed as spring rate in pounds per inch. Although the relief valve 500 could be produced with a single elongate spring, it is more economical to use a plurality of springs to reduce inventory carrying costs for this line of valves. The upper mainspring 415 and the lower mainspring 419 are identical to the spring 120 of relief valve 100. Likewise the upper interior spring 490 and the lower interior spring 496 (better seen in FIG. 17) are identical to the interior spring 99 of relief valve 100 (FIG. 6). Because these springs are stacked vertically, the combined spring rate for springs 415 and 419 is half of the spring rate of the relief valve 100. The combined spring rate for upper mainspring 415 and lower mainspring 419 is as follows:

| Set Pressure | Spring Rate |
| --- | --- |
| 150–500 psi | 87 lb./in. |
| 500–1,250 psi | 125 lb./in. |
| 1,250–1,850 psi | 200 lb./in. |
| 1,850–4,500 psi | 447 lb./in. |
| 4,500–5,500 psi | 645 lb./in. |

When four springs are used as in FIG. 17, the combined spring rate of all four springs, i.e., upper mainspring 415, upper interior spring 490, lower mainspring 419 and lower interior spring 490, is approximately 745 lb./in. to achieve a set pressure range of approximately 5,500–6,500 psi. Other set pressures can be achieved with springs of different rates.

FIG. 17 is a section view of the relief valve 500, which is identical to the relief valve of FIG. 16 except two interior springs 490 and 496 have been added. Upper interior spring 490 nests inside the upper mainspring 415 and lower interior spring 496 nests inside lower mainspring 419.

Upper interior spring 490 has a top end 492 and a bottom end 494. The top end 492 engages the adjusting cap 410, when in compression, and the bottom end 494 engages the spring follower 418. Lower interior spring 496 has a top 498 and a bottom 499. The top 498 engages the spring follower 418, when in compression, and the bottom 499 engages the spring follower 422.

Clockwise rotation of the adjusting cap 410 and/or the intermediate adjusting sleeve 410 compresses upper mainspring 415, upper interior spring 490, lower mainspring 419 and lower interior spring 496 to increase the set point of the relief valve 400. To reduce the set point, adjusting cap 410 and/or intermediate adjusting sleeve 412 are turned counterclockwise reducing the compression on the upper mainspring 415, the upper interior spring 490, the lower mainspring 419 and the lower interior spring 496.

The relief valve 500 is shown in FIGS. 16 and 17 with the same sealing components of valve 100 in FIGS. 3–5. In an alternative embodiment, not shown, the valve 500 can also utilize the sealing components of valve 200 in FIGS. 7–9. Specifically, the seal rings 239 and 241 and the adapters 201 and 248 of FIGS. 7 and 8 can be substituted for the seal rings 139 and 141 and the adapters 101 and 148 of FIGS. 16 and 17.

In another alternative embodiment, not shown, the valve 500 can also utilize the sealing components of valve 300 in FIGS. 10–12. Specifically, the seal carrier 226, the seal assembly and the seal plates 233 and 235 of Valve 300 in FIGS. 10 and 11 can be substituted for the plunger 126, gate 132; seal rings 139 and 141 and adapters 101 and 148 in the valve 500 of FIGS. 16 and 17.

In yet another alternative embodiment, not shown, the valve 500 can also utilize the sealing components of valve 400 in FIGS. 13–15. Specifically, the seal carrier 326, the seal assembly 332 and the seal plates 339 and 348 of valve 400 in FIGS. 13 and 14 can be substituted for the plunger 126, gate 132, seal rings 139 and 141 and adapters 101 and 148 in the valve 500 of FIGS. 16 and 17.

FIG. 18 is a graph showing the relief rate expressed in gallons per minute relative to overpressure expressed in psi. The purpose of this graph is to compare flow rates of the prior art relief valve 20 disclosed in U.S. Pat. No. 4,456,028 (FIG. 1) and the present invention. The lower line describes the performance of the prior art relief valve 20. The middle line describes the performance characteristics of the double port relief valves 100, 200, 300 and 400 of the present invention. The upper line describes the characteristics of the double port stacked spring relief valve 500 (FIGS. 16 and 17).

Assume, hypothetically, that the prior art relief valve 20 flows 4 gpm at a given overpressure (250 psi). The double port relief valve 100, 200, 300 and 400 of the present invention will flow twice as much, i.e., 8 gpm at the same overpressure. The double port stacked spring relief valve 500 will flow 16 gpm at the same overpressure. The increased flow capacities of the double port relief valve 100, 200, 300 and 400 and the double port stacked spring relief valve 500 are important advantages when compared with prior art designs.

In order to conveniently compare the performance characteristics of the prior art valve 20 (FIG. 1) with the present invention, the following table is presented.

| Valve | Ratio* | Relief Rate | Blowdown Dead Band |
| --- | --- | --- | --- |
| Prior Art Valve 20 (FIG. 1) | 3.3 | 1x | Approximately 20% |
| All Double Port Valves (valve 100, FIG. 2–6) (valve 200, FIG. 7–9) (valve 300, FIG. 10–12) (valve 400, FIG. 13–15) | 1.0 | 2x | Approximately 15–20% |
| Double Port Stacked Spring (valve 500, FIG. 16–17) | 1.0 | 4x | Approximately 15–20% |

*The Ratio is the total hydraulic area to the total seal contact area, previously discussed.

What is claimed is:

1. A relief valve connected to a pressurized fluid source to relieve excess pressure, the valve comprising:

a body defining an inlet and two outlets, the inlet connected to the pressurized fluid source and the outlets vented to atmosphere;

the body further defining a central flow passageway in fluid communication with the inlet and the outlets;

the body further defining a spring cavity sized and arranged to threadably engage an adjusting cap;

a main spring captured in the spring cavity by the adjusting cap so a set point for the relief valve can be adjusted by rotation of the adjusting cap;

a pair of opposing axially aligned seal plates positioned in the body adjacent each outlet, each seal plate extending into the central flow passageway and having a through bore to allow fluid flow from the central flow passageway, through the seal plates to the outlets;

an elongate seal carrier positioned in a bore in the body, the seal carrier moving from a closed position to an open position, one end of the seal carrier extending into the spring cavity and in contact with the main spring, and the opposite end extending into the central flow passageway, the opposite end defining a transverse bore;

the elongate seal carrier further defining a shoulder that abuts the seal plates and acts as a stop to define the maximum travel in the central flow passageway that can be achieved by the seal carrier in response to force applied by the main spring;

a seal assembly carried by the seal carrier from the closed position to the open position in response to excess pressure in the inlet and central flow passageway, allowing excess fluid pressure to flow from the inlet, through the central flow passageway, the bores of the seal plates and the outlets to vent to atmosphere and the seal assembly being returned to the closed position after the excess pressure has been relieved in response to force exerted by the main spring upon the seal carrier; and the seal assembly having:
- a pair of opposing axially aligned seal rings;
- a seal spring urging the seal rings into contact with the seal plates;
- a pair of o-rings to achieve a seal between the seal rings and the seal carrier;
- and each seal ring further defining a flat sealing surface in sliding contact with the seal plates.

2. The apparatus of claim 1, further including opposing circular recesses formed on each end of the transverse bore, the diameter of each recess being greater than the diameter of the transverse bore, and wherein each seal ring has a outside circumferential step connected by a shoulder to an inside circumferential step, the outside step having a diameter greater than the inside step, the inside step sized and arranged to slidingly engage the transverse bore in the seal carrier and the outside step sized and arranged to slidingly engage the recess of the seal carrier, each o-ring positioned about the inside circumferential step, so pressure from the pressurized fluid source acts against the shoulder of each seal ring to achieve a seal between the flat sealing surface of each seal ring and the opposing seal plate.

3. The apparatus of claim 2, wherein each seal ring is configured so a ratio of a total hydraulic area to a total seal contact area is no greater than 1 and a blowdown dead band is no greater than 20%.

4. The apparatus of claim 3, further including an interior spring sized and arranged to nest inside the main spring to be concurrently adjusted with the main spring when the adjusting cap is rotated to allow the valve to have a higher set point.

5. The apparatus of claim 1, wherein each seal disk has a first circumferential step connected by a shoulder to a second circumferential step, the first step having a diameter greater than the second step, the second step sized and arranged to slidingly engage the transverse bore in the seal carrier, the second step having an o-ring groove formed in the outer circumference with one o-ring in each groove, the groove having first and second opposing parallel o-ring groove shoulders, to allow pressure from the pressurized fluid source to act against the first o-ring groove shoulder to achieve a seal between the seal rings and the opposing seal plates.

6. The apparatus of claim 5, wherein each seal ring is configured so a ratio of a total hydraulic area to a total seal contact area is no greater than 1 and a blowdown dead band is no greater than 20%.

* * * * *